United States Patent
Zhao

(10) Patent No.: US 11,303,323 B2
(45) Date of Patent: Apr. 12, 2022

(54) FREQUENCY HOPPING CONFIGURATION METHOD AND DEVICE

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/864,951

(22) Filed: May 1, 2020

(65) Prior Publication Data

US 2020/0259521 A1 Aug. 13, 2020

Related U.S. Application Data

(63) Continuation of application No. PCT/CN2017/111408, filed on Nov. 16, 2017.

(51) Int. Cl.
*H04B 1/7136* (2011.01)
*H04W 72/04* (2009.01)

(52) U.S. Cl.
CPC ...... *H04B 1/7136* (2013.01); *H04W 72/0453* (2013.01)

(58) Field of Classification Search
CPC .......... H04W 72/042; H04W 72/0453; H04W 72/0406; H04W 74/006; H04B 1/713; H04B 1/7143; H04B 1/7136; H04L 5/0012
See application file for complete search history.

(56) References Cited

U.S. PATENT DOCUMENTS 9,276,710 B2 * 3/2016 Damnjanovic ......... H04L 5/001
9,537,620 B2 * 1/2017 Fei ..................... H04W 72/0453
(Continued)

FOREIGN PATENT DOCUMENTS

CN 101610101 A 12/2009
CN 102158252 A 8/2011
(Continued)

OTHER PUBLICATIONS

R1-1715689 3GPP TSG RAN WG1 Meeting NR#3 Nagoya, Japan, Sep. 18-21, 2017.
(Continued)

*Primary Examiner* — Sophia Vlahos
(74) *Attorney, Agent, or Firm* — Syncoda LLC; Feng Ma

(57) ABSTRACT

A frequency hopping configuration method can be applied to a base station. The base station can configure at least one bandwidth part BWP for a terminal. The method can include: configuring a frequency hopping rule for each configured BWP; when the terminal is instructed to perform uplink transmission hopping, determining, according to the configured hopping rule, a hopping rule corresponding to a BWP currently being used by the terminal; and sending the corresponding hopping rule to the terminal, such that the terminal determines a second frequency domain resource position after frequency hopping has been performed according to the corresponding frequency hopping rule and a first frequency domain resource position prior to performing frequency hopping, and performs uplink transmission at the second frequency domain resource position.

21 Claims, 17 Drawing Sheets

(56) References Cited

U.S. PATENT DOCUMENTS

| | | | |
|---|---|---|---|
| 2015/0270868 A1* | 9/2015 | Park | H04B 1/7143 |
| | | | 370/329 |
| 2016/0218788 A1 | 7/2016 | Yum et al. | |
| 2019/0036665 A1* | 1/2019 | Park | H04L 5/0051 |
| 2019/0053103 A1* | 2/2019 | Manolakos | H04W 28/20 |
| 2019/0132824 A1* | 5/2019 | Jeon | H04L 5/0092 |
| 2020/0106475 A1* | 4/2020 | Chen | H04W 72/042 |

FOREIGN PATENT DOCUMENTS

| | | |
|---|---|---|
| CN | 102781110 A | 11/2012 |
| CN | 104079373 A | 10/2014 |
| CN | 104221416 A | 12/2014 |
| CN | 105472532 A | 4/2016 |
| CN | 106455097 A | 2/2017 |
| CN | 103546194 A | 9/2017 |
| RU | 2406230 C2 | 12/2010 |

OTHER PUBLICATIONS

R1-1717828 3GPP TSG RAN WG1 Meeting 90bis Prague, CZ, Oct. 9-13, 2017.

RU First Office Action in Application No. 2020118866, dated Oct. 19, 2020.

RU First Office Action in Application No. 2020118866, dated Oct. 19, 2020, with English Translation.

Korea 1st Office Action in Application No. 10-2020-7014144, dated May 24, 2021.

Huawei, HiSilicon: On uplink data scheduling and hopping, 3GPP TSG RAN WG1 Meeting 90bis, Prague, Czech Republic, Oct. 9-13, 2017, (R1-1717058).

Nokia, Alcatel-Lucent Shanghai bell: On resource allocation in frequency domain for PDSCH and PUSCH in NR, 3GPP TSG RAN WG1 Ad Hoc Meeting #2, Qingdao, China, Jun. 27-30, 2017, (R1-1710989).

Extended European Search Report (EESR) in EP Application No. 17932252.4, dated Jun. 8, 2021.

1st Office Action in Japan Application No. 2020-526134, dated Aug. 10, 2021.

OPPO, "Resource allocation for PUCCH" (R1-1718047) 3GPP TSG RAN WG1 Meeting 90bis Prague, CZ, Oct. 9-13, 2017.

Korea Notice of Allowance in Application No. 10-2020-7014144, dated Nov. 12, 2021.

3GPP TSG RAN WG1 Meeting 90bis, Prague, CZ, Oct. 9-13, 2017, Title: Support of short-PUCCH over 2 OFDM symbols.

3GPP TSG RAN WG1 Meeting 90bis, Prague, CZ, Oct. 9-13, 2017, Title: Resource allocation for PUCCH.

3GPP TSG RAN WG1 Meeting 90bis, Prague, CZ, Oct. 9-13, 2017, Title: Summary of contributions for PUCCH resource allocation.

3GPP TSG RAN WG1 Meeting 90bis, Prague, CZ, Oct. 9-13, 2017, Title: Email discussions on UL transmission procedures.

* cited by examiner

FREQUENCY HOPPING CONFIGURATION METHOD AND DEVICE

CROSS-REFERENCE TO RELATED APPLICATION

This application is a continuation of international application no. PCT/CN2017/111408 filed on Nov. 16, 2017, the disclosure of which is hereby incorporated by reference in its entirety.

BACKGROUND

Frequency hopping is a technology often used in communication systems. By transmitting on different frequency domain resources, the gain of channel frequency diversity can be obtained. User equipment (UE) in the same cell may use the same system bandwidth and cell configuration information, and select the same frequency hopping method.

SUMMARY

The present disclosure relates generally to the field of communication technologies, and more specifically to a frequency hopping configuration method and device.

According to a first aspect of the embodiments of the present disclosure, a frequency hopping configuration method is provided. The method can be applied in a base station. The base station configures at least one BWP for a terminal. The method includes:

configuring a frequency hopping configuration for each configured BWP;

in response to instructing the terminal to perform uplink transmission frequency hopping, determining, according to the configured frequency hopping configuration, a frequency hopping configuration corresponding to a BWP with which the terminal being configured currently; and sending the corresponding frequency hopping configuration to the terminal, so that the terminal determines, according to the corresponding frequency hopping configuration and a first frequency domain resource position before the frequency hopping, a second frequency domain resource position after the frequency hopping, and performs uplink transmission at the second frequency domain resource position.

According to a second aspect of the embodiments of the present application, a frequency hopping configuration method is provided. The method is applied in a terminal, and the terminal is configured, by a base station, at least one BWP. The method includes:

receiving a frequency hopping configuration sent by the base station, wherein the frequency hopping configuration is a frequency hopping configuration configured by the base station for a BWP with which the terminal being configured currently;

in response to performing uplink transmission frequency hopping, determining, according to the frequency hopping configuration and a first frequency domain resource position before the frequency hopping, a second frequency domain resource position after the frequency hopping; and performing uplink transmission at the second frequency domain resource position.

According to a third aspect of the embodiments of the present application, a frequency hopping configuration device is provided. The device is applied in a base station, and the base station configures at least one BWP for a terminal. The device includes:

a configuration module configured to configure a frequency hopping configuration for each configured BWP;

a frequency hopping configuration determining module configured to, in response to instructing the terminal to perform uplink transmission frequency hopping, determine, according to the configured frequency hopping configuration, a frequency hopping configuration corresponding to a BWP with which the terminal being configured currently; and a first sending module configured to send the corresponding frequency hopping configuration to the terminal, so that the terminal determines, according to the corresponding frequency hopping configuration and a first frequency domain resource position before the frequency hopping, a second frequency domain resource position after the frequency hopping, and perform uplink transmission at the second frequency domain resource position.

According to a fourth aspect of the embodiments of the present application, a frequency hopping configuration device is provided. The device is applied in a terminal, and the terminal is configured, by a base station, at least one BWP. The device includes:

a first receiving module configured to receive a frequency hopping configuration sent by the base station, wherein the frequency hopping configuration is a frequency hopping configuration configured by the base station for a BWP with which the terminal being configured currently;

a resource position determining module configured to, in response to performing uplink transmission frequency hopping, determine, according to the frequency hopping configuration and a first frequency domain resource position before the frequency hopping, a second frequency domain resource position after the frequency hopping; and an uplink transmission module configured to perform uplink transmission at the second frequency domain resource position.

According to a fifth aspect of the embodiments of the present disclosure, a non-transitory computer-readable storage medium is provided, a computer program is stored on the storage medium, the computer program is configured to execute the frequency hopping configuration method according to the above first aspect.

According to a sixth aspect of the embodiments of the present disclosure, a non-transitory computer-readable storage medium is provided, a computer program is stored on the storage medium, and the computer program is configured to execute the frequency hopping configuration method according to the above first aspect.

According to a seventh aspect of the embodiments of the present disclosure, a frequency hopping configuration device is provided. The device is applied in a base station, and the base station configures at least one BWP for a terminal. the device includes:

a processor; and memory storing instructions executable by the processor;

wherein the processor is configured to:

configure a frequency hopping configuration for each configured BWP;

in response to instructing the terminal to perform uplink transmission frequency hopping, determine, according to the configured frequency hopping configuration, a frequency hopping configuration corresponding to a BWP with which the terminal being configured currently; and send the corresponding frequency hopping configuration to the terminal, so that the terminal determines, according to the corresponding frequency hopping configuration and a first frequency domain resource position before the frequency hopping, a second frequency domain resource position after the frequency hopping, and performs uplink transmission at the second frequency domain resource position.

According to an eighth aspect of the embodiments of the present disclosure, a frequency hopping configuration device is provided. The device is applied in a terminal, and a base station configures at least one BWP for the terminal. The device includes:

a processor; and memory storing instructions executable by the processor;

wherein the processor is configured to:

receive a frequency hopping configuration sent by the base station, wherein the frequency hopping configuration is a frequency hopping configuration configured by the base station for a BWP with which the terminal being configured currently;

in response to performing uplink transmission frequency hopping, determine, according to the frequency hopping configuration and a first frequency domain resource position before the frequency hopping, a second frequency domain resource position after the frequency hopping; and perform uplink transmission at the second frequency domain resource position.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used in the present disclosure only tend to depict specific embodiments, rather than restricting the present disclosure. Unless the exceptional case in which the context clearly gives supports, the singular forms "a," "an," and "the" used in the present disclosure and accompany claims are intended to include the plural forms. It should also be appreciated that the expression "and/or" used herein indicates including any and all possible combinations of one or more of the associated listed items.

It should be understood, although terms first, second, third and the like are used in the present disclosure to depict various information, such information is not restricted by these terms. These terms are only used to distinguish information of the same type from each other. For example, without departing from the scope of the present disclosure, the first information may also be referred to as the second information. Similarly, the second information may also be referred to as the first information. Depending on context, the word "if" used herein may be explained to "when" or "upon" or "in response to determining . . . ."

In the new generation of communication system, different UE may be configured with different Band Width Part (BWP) by the system. If the conventional uplink frequency hopping design is used, the complexity of scheduling of the base station may increase, the fragmentation of system resource usage may also increase, and the utilization efficiency of the system resource can be reduced.

Figure 1:
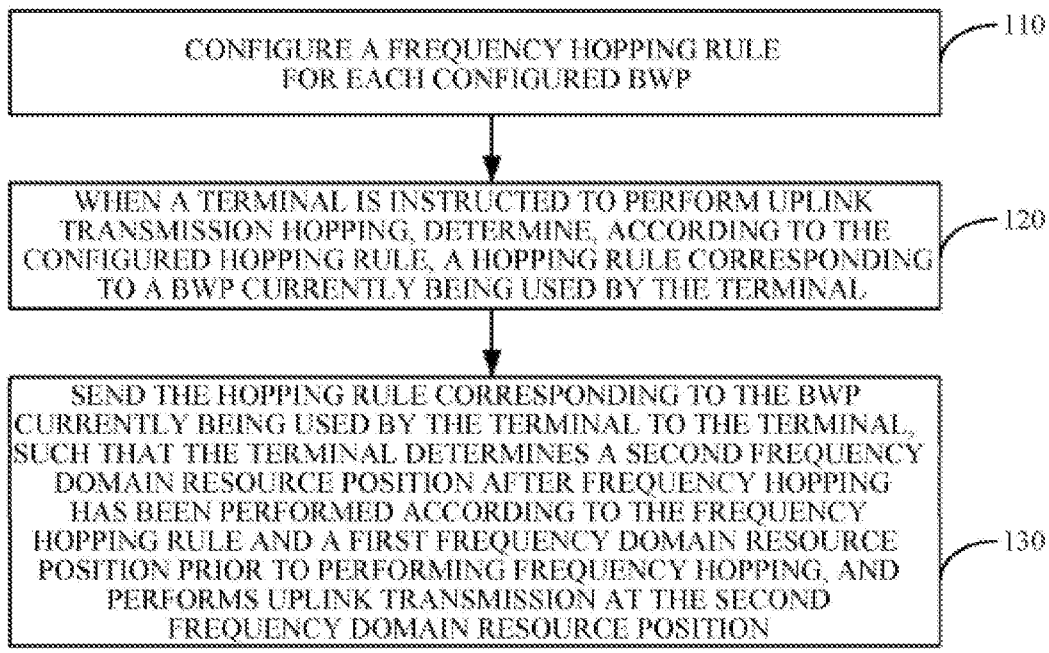
FIG. 1 is a flowchart illustrating a frequency hopping configuration method according to some embodiments.
Figure 2:
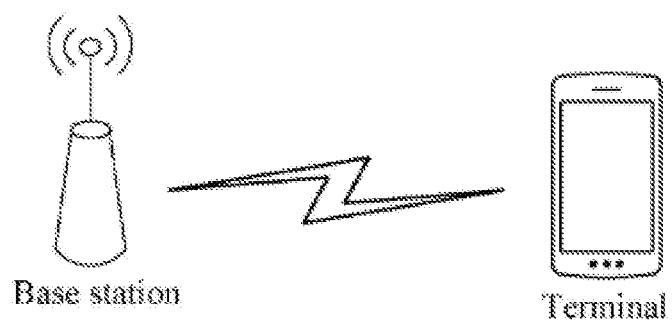
FIG. 2 is a scenario diagram illustrating a frequency hopping configuration method according to some embodiments.

FIG. 1 is a flowchart illustrating a frequency hopping configuration method according to some embodiments, and FIG. 2 is a scenario diagram of a frequency hopping configuration method according to some embodiments. The frequency hopping configuration method may be applied in a base station, and the base station configures at least one BWP for the terminal. As shown in FIG. 1, the frequency hopping configuration method may include the following steps 110-130.

In step 110, a frequency hopping configuration is configured for each configured BWP.

In the embodiments of the present disclosure, the base station may configure one or more different BWPs for the same terminal according to the actual situation, and the configured BWPs generally do not exceed 4. The base station may also configure a frequency hopping configuration for each configured BWP, and the frequency hopping configurations configured by the base station for different BWPs of the same terminal may be the same or different.

For example, the base station configures two BWPs for the terminal, namely BWP1 and BWP2, and the frequency hopping configuration configured for BWP1 is one frequency hopping subband scheme, and the frequency hopping configuration configured for BWP2 is two different frequency hopping subband schemes.

In addition, the base station can also assign different BWPs to different terminals according to capabilities and needs of the terminals. For example: the system bandwidth is 400 MHz, the uplink transmission bandwidth capability of terminal 1 is 100 MHz, and the uplink transmission bandwidth capability of terminal 2 is 200 MHz, then the base station may configure a BWP not greater than 100 MHz for terminal 1 and configure a BWP not greater than 200 MHz for terminal 2.

In step 120, when instructing the terminal to perform uplink transmission frequency hopping, a frequency hopping configuration corresponding to a BWP with which the terminal being configured currently is determined according to the configured frequency hopping configuration.

In the embodiments of the present disclosure, the base station may configure a plurality of BWPs for the terminal in advance, but at the same time, the base station can only activate one of the BWPs, that is, the BWP with which the terminal being configured currently. In addition, the base station can also control the terminal to dynamically switch between different BWPs through downlink control signaling.

In step 130, the frequency hopping configuration corresponding to the BWP with which the terminal being configured currently is sent to the terminal, so that the terminal determines a second frequency domain resource position after frequency hopping according to the frequency hopping configuration and a first frequency domain resource position before frequency hopping, and performs uplink transmission at the second frequency domain resource position.

In an exemplary scenario, as shown in FIG. 2, a terminal and a base station are included. The base station configures one or more BWPs for the terminal according to the actual situation, and also configures the frequency hopping configuration for each BWP. When the base station instructs the terminal to perform uplink transmission frequency hopping, the frequency hopping configuration corresponding to the BWP with which the terminal being configured currently can be determined according to the frequency hopping configurations that have been configured in advance, and the frequency hopping configuration corresponding to the BWP with which the terminal being configured currently is sent to the terminal, so that the terminal can determine the second frequency domain resource position after frequency hopping according to the frequency hopping configuration indicated by the base station and the first frequency domain resource position before the frequency hopping, and perform uplink transmission at the second frequency domain resource position.

It can be seen from the foregoing embodiments that by configuring a frequency hopping configuration for each configured BWP, determining the frequency hopping configuration corresponding to the BWP with which the terminal being configured currently according to the configured frequency hopping configuration when instructing a terminal to perform uplink transmission frequency hopping, and sending the frequency hopping configuration corresponding to the BWP with which the terminal being configured currently to the terminal, the terminal can determine the second frequency domain resource position after frequency hopping according to the frequency hopping configuration indicated by the base station and the first frequency domain resource position before frequency hopping, and perform uplink transmission at the second frequency domain resource position, thereby realizing that the terminal completes uplink transmission frequency hopping under the frequency hopping configuration indicated by the base station, which not only reduces the uplink scheduling complexity, but also reduces the fragmentation of system resources and improves the utilization efficiency of system resource.

Figure 3:
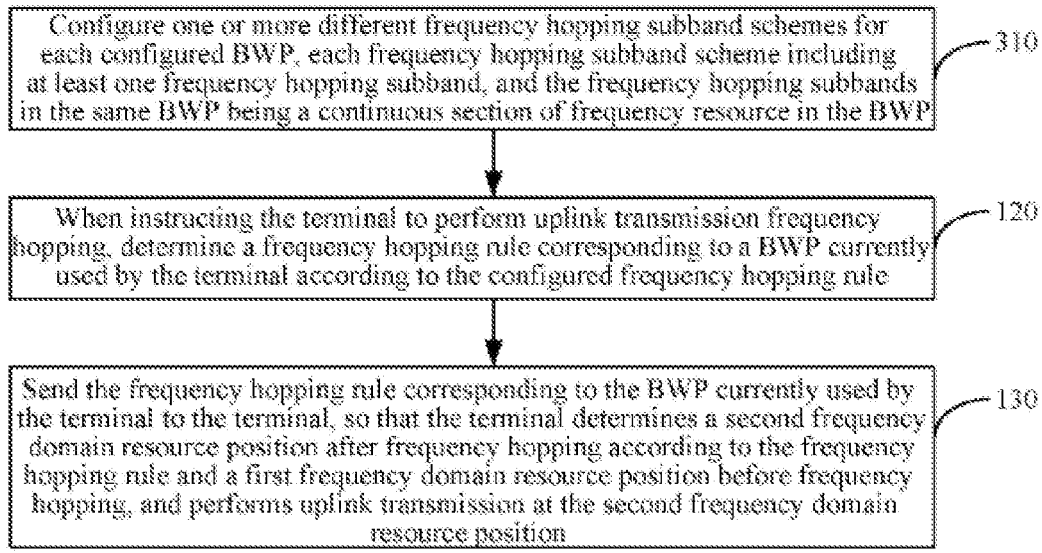
FIG. 3 is a flowchart illustrating another frequency hopping configuration method according to some embodiments.
Figure 4:
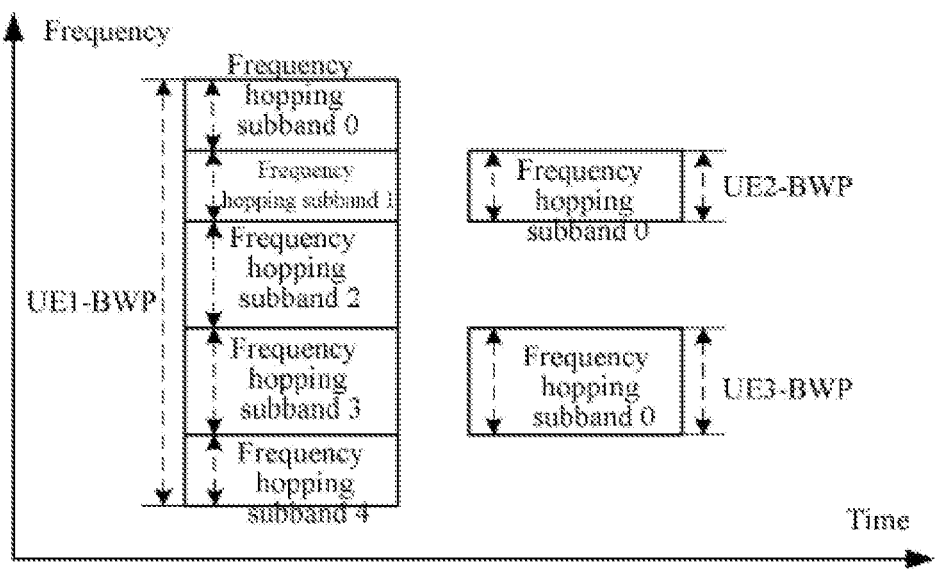
FIG. 4 is a schematic diagram of a frequency hopping subband scheme according to some embodiments.
Figure 5:
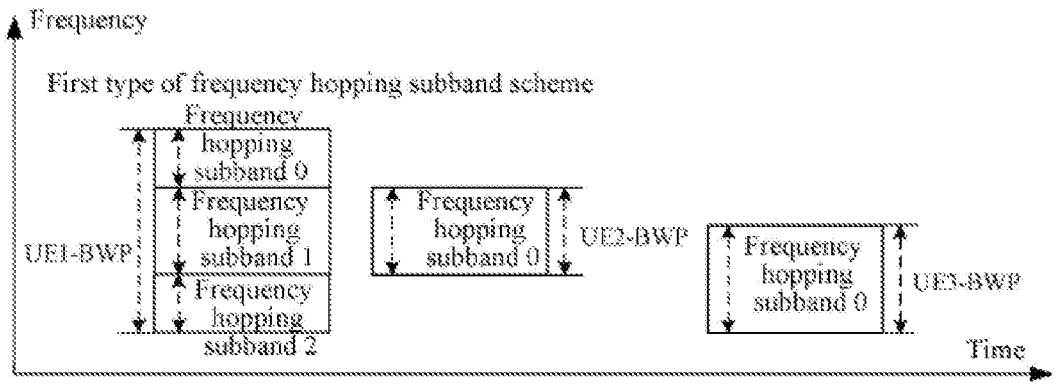
FIG. 5 is a schematic diagram of another frequency hopping subband scheme according to some embodiments.
Figure 6:
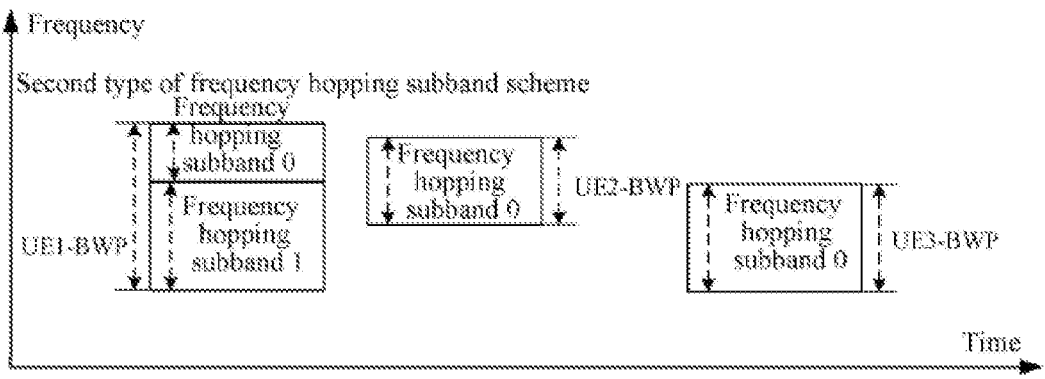
FIG. 6 is a schematic diagram of another frequency hopping subband scheme according to some embodiments.

FIG. 3 is a flowchart illustrating another frequency hopping configuration method according to some embodiments, FIG. 4 is a schematic diagram of a frequency hopping subband solution according to some embodiments, FIG. 5 is a flowchart according to some embodiments, and FIG. 6 is a schematic diagram of another frequency hopping subband scheme according to some embodiments. The frequency hopping configuration method may be used for a base station, and based on the method shown in FIG. 1, the frequency hopping configuration may be a frequency hopping subband scheme. When step 110 is performed, as shown in FIG. 3, it may include the following step 310.

In step 310, one or more different frequency hopping subband schemes are configured for each configured BWP. Each frequency hopping subband scheme includes at least one frequency hopping subband. The frequency hopping subbands in the same BWP are a section of continuous frequency resources in the BWP.

In the embodiments of the present disclosure, the base station may configure one or more different frequency hopping subband schemes for each configured BWP in advance, so that when the base station instructs the terminal to perform uplink transmission frequency hopping, the frequency hopping configuration corresponding to the BWP with which the terminal being configured currently can be timely assigned to the terminal.

In an exemplary schematic diagram, as shown in FIG. 4, it is assumed that there are three terminals in the system: terminal1, terminal2, and terminal3, respectively. The base station configures a frequency hopping subband scheme for terminal1-BWP, terminal2-BWP, and terminal3-BWP. The frequency hopping subband scheme configured for terminal1-BWP includes five non-overlapping frequency hopping subbands, the frequency hopping subband scheme configured for terminal2-BWP includes one frequency hopping subband, and the frequency hopping subband scheme configured for terminal3-BWP includes one frequency hopping subband.

In an example schematic diagram, the base station configures two types of frequency hopping subband schemes for terminal1-BWP: the first type of the frequency hopping subband scheme includes three non-overlapping frequency hopping subbands, as shown in FIG. 5; and the second type of the frequency hopping subband scheme includes two non-overlapping frequency hopping subbands, as shown in FIG. 6. In addition, the base station configures one type of frequency hopping subband scheme for terminal2-BWP, and the configured frequency hopping subband scheme includes one frequency hopping subband; the base station also configures one type of frequency hopping subband scheme for terminal3-BWP, and the configured frequency hopping subband scheme includes one frequency hopping subband.

In the first type of frequency-hopping subband scheme of terminal1-BWP, there is one frequency-hopping subband being the same as the frequency-hopping subband of terminal2-BWP; in the second type of frequency-hopping subband scheme, there is one frequency hopping subband being the same as the frequency hopping subband of terminal3-BWP. According to scheduling by the base station, terminal1 and terminal2 may be scheduled for uplink transmission simultaneously in a certain Transmission Timing Interval (TTI). In this TTI, terminal1 may use the first type of frequency hopping subband scheme according to the downlink signaling instruction. terminal1 and terminal3 may also be scheduled by the base station for uplink transmission in another TTI simultaneously. In this TTI, terminal1 may use the second type of frequency hopping subband scheme according to the downlink signaling instruction. Thus, the same terminal1 can flexibly use different frequency hopping subband schemes in different TTIs according to the actual scheduling situation.

It can be seen from the above embodiments that one or more different frequency hopping subband schemes can be configured for each configured BWP. Each frequency hopping subband scheme includes at least one frequency hopping subband, and the frequency hopping subbands in the same BWP are a section of continuous frequency resources in the BWP, thus realizing the uplink transmission frequency hopping of the terminal under the frequency hopping subband scheme indicated by the base station, which not only enriches the implementation manners of frequency hopping configuration, but also improves the use efficiency of system resource.

Figure 7:
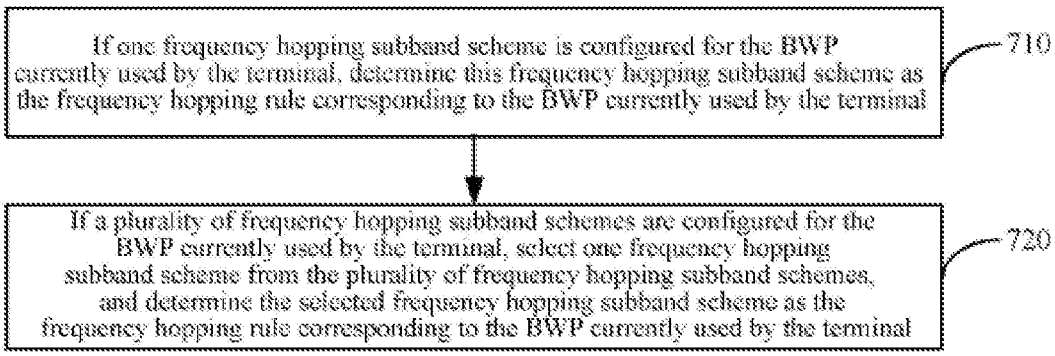
FIG. 7 is a flowchart illustrating another frequency hopping configuration method according to some embodiments.

FIG. 7 is a flowchart illustrating another frequency hopping configuration method according to some embodiments. The frequency hopping configuration method may be used in a base station, and based on the method shown in FIG. 3, the frequency hopping configuration may be frequency hopping subband scheme. When step 120 is performed, as shown in FIG. 7, the method may include the following steps 710-720.

In step 710, if one frequency hopping subband scheme is configured for the BWP with which the terminal being configured currently, this frequency hopping subband scheme is determined as the frequency hopping configuration corresponding to the BWP with which the terminal being configured currently.

In step 720, if a plurality of frequency hopping subband schemes are configured for the BWP with which the terminal being configured currently, one frequency hopping subband scheme is selected from the plurality of frequency hopping subband schemes, and the selected frequency hopping subband scheme is determined as the frequency hopping configuration corresponding to the BWP with which the terminal being configured currently.

In some embodiments of the present disclosure, the base station may flexibly select the frequency hopping configuration corresponding to the BWP with which the terminal being configured currently according to an actual scheduling situation. For example, as shown in FIG. 5, according to scheduling of the base station, when terminal1 and terminal2 may be scheduled for uplink transmission at the same time in a TTI, in this TTI, the base station may select the first type of frequency hopping subband scheme as the frequency hopping configuration corresponding to the BWP with which the terminal being configured currently. Similarly, according to scheduling of the base station, terminal1 and terminal3 may also be scheduled by the base station for uplink transmission in another TTI at the same time. In another TTI, the base station may select the second type of frequency hopping subband scheme as the frequency hopping configuration corresponding to the BWP with which the terminal being configured currently.

It can be seen from the above embodiments that one or more frequency hopping subband schemes may be configured in advance for the BWP with which the terminal being configured currently. When the base station instructs the terminal to perform uplink transmission frequency hopping, it can select an appropriate frequency hopping subband scheme from these frequency hopping subband schemes configured in advance and allocate it to the terminal, which can avoid the problem of the decrease in use efficiency of the system resource caused by different terminals using different BWPs, thereby improving the use efficiency of system resource.

Figure 8:
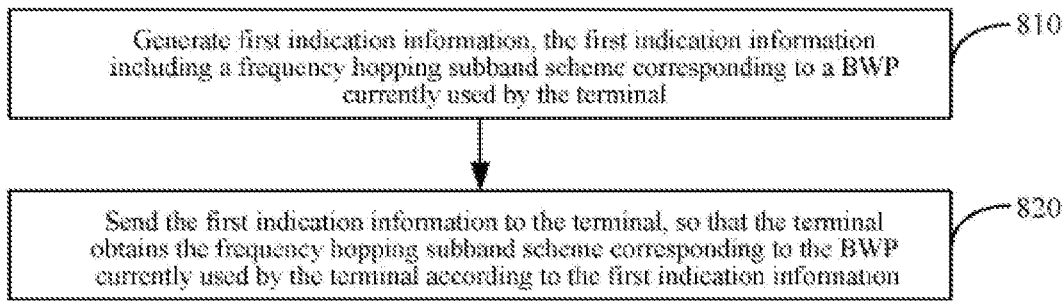
FIG. 8 is a flowchart illustrating another frequency hopping configuration method according to some embodiments.

FIG. 8 is a flowchart showing another frequency hopping configuration method according to some embodiments. The frequency hopping configuration method may be used in a base station, and based on the method shown in FIG. 7, the frequency hopping configuration may be one or multiple different frequency hopping subband schemes. When step 130 is performed, as shown in FIG. 8, the following steps 810-820 may be included.

In step 810, first indication information is generated, and the first indication information includes a frequency hopping subband scheme corresponding to a BWP with which the terminal being configured currently.

In step 820, the first indication information is sent to the terminal, so that the terminal obtains the frequency hopping subband scheme corresponding to the BWP with which the terminal being configured currently according to the first indication information.

It can be seen from the foregoing embodiment that the frequency hopping subband scheme corresponding to the BWP with which the terminal being configured currently indicated by the base station can be delivered to the terminal through the first indication information, so that the terminal can accurately obtain the frequency hopping subband scheme corresponding to the BWP with which the terminal being configured currently from the first indication information, thereby improving the accuracy of frequency hopping configuration.

Figure 9:
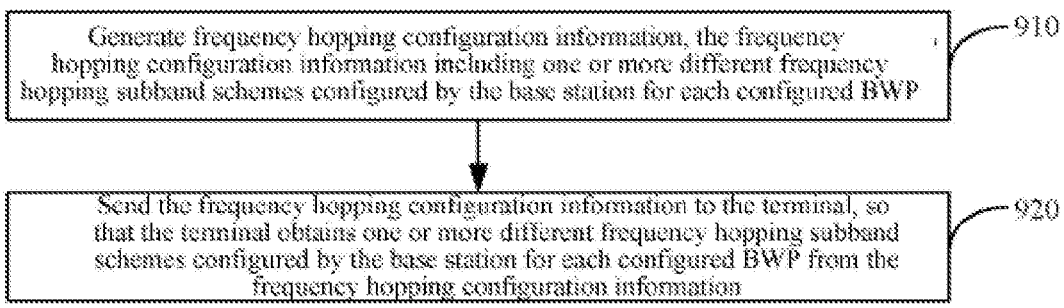
FIG. 9 is a flowchart illustrating another frequency hopping configuration method according to some embodiments.

FIG. 9 is a flowchart illustrating another frequency hopping configuration method according to some embodiments. The frequency hopping configuration method may be used in a base station, and based on the method shown in FIG. 3, the frequency hopping configuration may be one or multiple different frequency hopping subband schemes. After step 310 is performed, as shown in FIG. 9, the frequency hopping configuration method may further include the following steps 910-920.

In step 910, frequency hopping configuration information is generated, and the frequency hopping configuration information includes one or more different frequency hopping subband schemes configured by the base station for each configured BWP.

In the embodiments of the present disclosure, after the base station configures one or more different frequency hopping subband schemes for each configured BWP of the terminal, it may use the frequency hopping configuration information to deliver one or more different frequency hopping subband schemes corresponding to each configured BWP to the terminal. The purpose is to let the terminal know the specific content of these frequency hopping subband schemes in advance. When the base station instructs the terminal to perform uplink transmission frequency hopping, it only needs to inform the terminal of a frequency hopping subband scheme identifier corresponding to BWP with which the terminal being configured currently, so that the terminal determines the frequency hopping subband scheme corresponding to the BWP that it currently uses according to the frequency hopping subband scheme identifier.

In step 920, the frequency hopping configuration information is sent to the terminal, so that the terminal obtains one or more different frequency hopping subband schemes configured by the base station for each configured BWP from the frequency hopping configuration information.

It can be seen from the above embodiments that after configuring the frequency hopping configuration for each configured BWP, the base station may deliver one or more different frequency hopping subband schemes configured for each configured BWP to the terminal by using the frequency hopping configuration information, so that the terminal can know the specific content of these frequency hopping subband schemes in advance. When the base station instructs the terminal to perform uplink transmission frequency hopping, the frequency hopping subband scheme corresponding to BWP with which the terminal being configured currently can be determined by only the frequency hopping subband scheme identifier indicated by the base station, thereby improving the efficiency of frequency hopping configuration.

Figure 10:
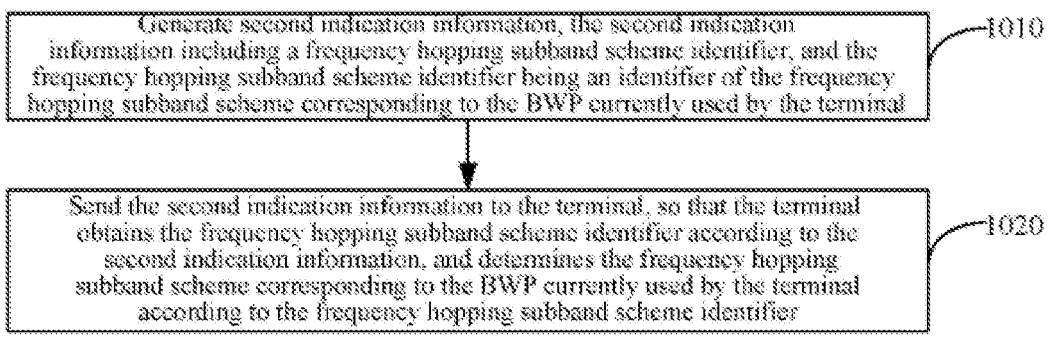
FIG. 10 is a flowchart illustrating another frequency hopping configuration method according to some embodiments.

FIG. 10 is a flowchart illustrating another frequency hopping configuration method according to some embodiments. The frequency hopping configuration method may be used in a base station, and based on the method shown in FIG. 9, the frequency hopping configuration may be one or more different frequency hopping subband schemes. When step 130 is performed, as shown in FIG. 10, the following steps 1010-1020 may be included.

In step 1010, second indication information is generated, the second indication information includes a frequency hopping subband scheme identifier, and the frequency hopping subband scheme identifier is an identifier of the frequency hopping subband scheme corresponding to the BWP with which the terminal being configured currently.

In step 1020, the second indication information is sent to the terminal, so that the terminal obtains the frequency hopping subband scheme identifier according to the second indication information, and determines the frequency hopping subband scheme corresponding to the BWP with which the terminal being configured currently according to the frequency hopping subband scheme identifier.

It can be seen from the foregoing embodiments that the frequency hopping subband scheme identifier can be sent to the terminal through the second indication information, so that the terminal can determine the frequency hopping subband scheme corresponding to the BWP with which the terminal being configured currently according to the frequency hopping subband scheme identifier indicated by the base station and the specific content of the different frequency hopping subband schemes known in advance, thereby ensuring that the terminal accurately determines the frequency hopping subband scheme corresponding to the BWP currently used by itself, and also increasing the instruction speed of the frequency hopping configuration.

Figure 11:
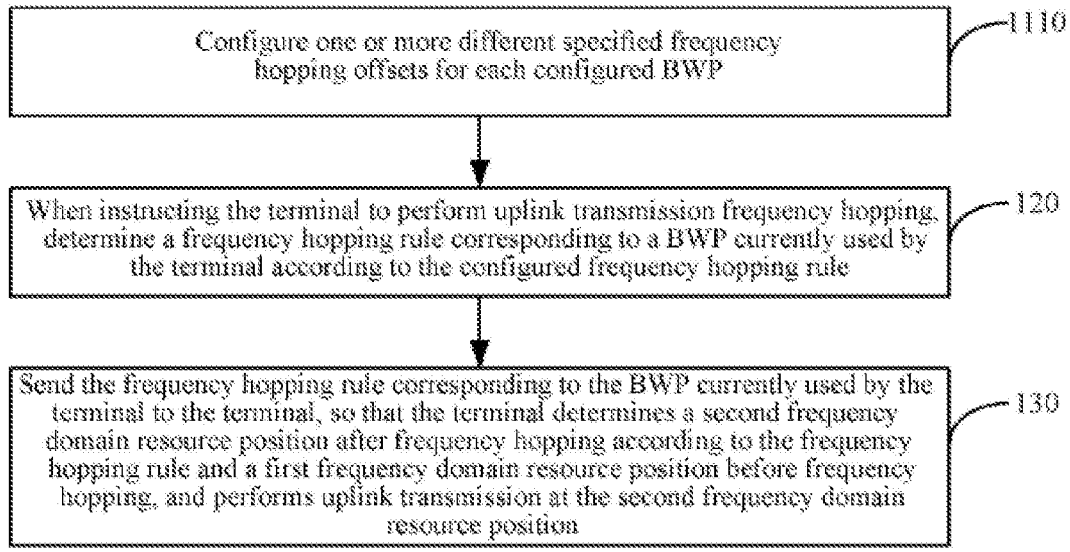
FIG. 11 is a flowchart illustrating another frequency hopping configuration method according to some embodiments.

FIG. 11 is a flowchart illustrating another frequency hopping configuration method according to some embodiments. The frequency hopping configuration method may be used in a base station, and based on the method shown in FIG. 1, the frequency hopping configuration may be a specified frequency hopping offset. When step 110 is performed, as shown in FIG. 11, the method may include the following step 1110.

In step 1110, one or more different specified frequency hopping offsets are configured for each configured BWP.

In the embodiment of the present disclosure, in order to meet the requirement of more flexible frequency hopping offset caused by different BWP configurations, one or more different specified frequency hopping offsets may be configured for different BWPs. When performing dynamic scheduling according to the actual scheduling situation, the base station may select an appropriate specified frequency hopping offset; or, when the uplink transmission resource allocation of the terminal is semi-static allocation, the base station may directly indicate the frequency domain offset needing to be used by the frequency hopping when the uplink resource allocation is performed.

It can be seen from the above embodiments that, by configuring one or more different specified frequency hopping offsets for each configured BWP, the terminal can complete the uplink transmission frequency hopping at the specified frequency hopping offset indicated by the base station, which enriches the implementation manners of frequency hopping configuration, and also improves the speed of completing the frequency hopping for uplink transmission.

Figure 12:
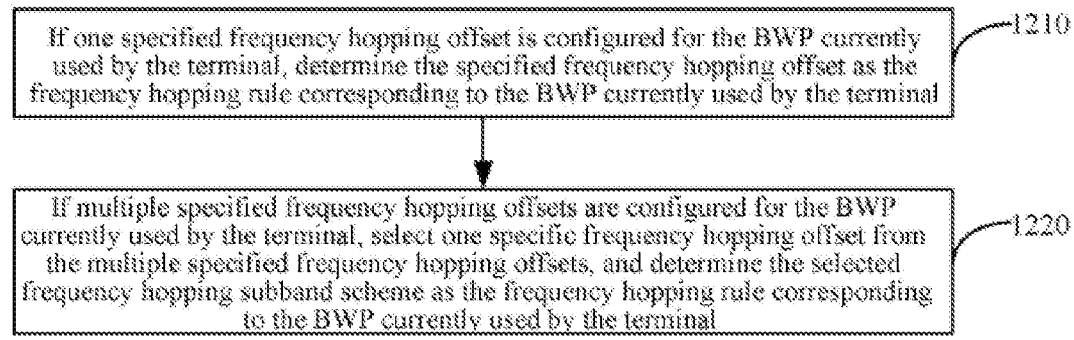
FIG. 12 is a flowchart illustrating another frequency hopping configuration method according to some embodiments.

FIG. 12 is a flowchart illustrating another frequency hopping configuration method according to some embodiments. The frequency hopping configuration method may be used in a base station, and based on the method shown in FIG. 11, the frequency hopping configuration may be a specified frequency hopping offset. When performing step 120, as shown in FIG. 12, the method may include the following steps 1210-1220.

In step 1210, if one specified frequency hopping offset is configured for the BWP with which the terminal being configured currently, the specified frequency hopping offset is determined as the frequency hopping configuration corresponding to the BWP with which the terminal being configured currently.

In step 1220, if multiple specified frequency hopping offsets are configured for the BWP with which the terminal being configured currently, one specific frequency hopping offset is selected from the multiple specified frequency hopping offsets, and the selected frequency hopping subband scheme is determined as the frequency hopping configuration corresponding to the BWP with which the terminal being configured currently.

For example, the base station pre-configures 4 specified frequency hopping offsets for terminal1-BWP, namely specified frequency hopping offset 1, specified frequency hopping offset 2, specified frequency hopping offset 3, and specified frequency hopping offset 4. When the base station performs uplink data scheduling, it may indicate in the uplink scheduling information which specified frequency hopping offset is to be used.

It can be seen from the above embodiments that one or more specified frequency hopping offsets can be configured in advance for the BWP with which the terminal being configured currently. When the base station instructs the terminal to perform uplink transmission frequency hopping, an appropriate specified frequency hopping offset is selected from the specified frequency hopping offsets configured in advance and is allocated to the terminal, so that the problem of the decrease in use efficiency of system resource caused by different terminals using different BWPs can be avoided, thereby improving the use efficiency of system resource.

Figure 13:
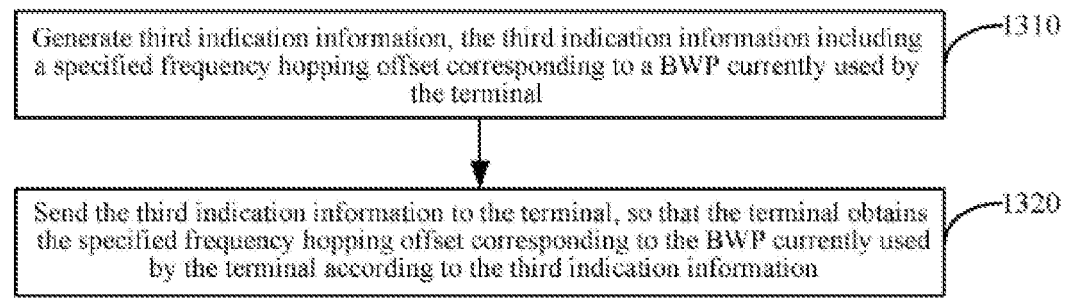
FIG. 13 is a flowchart illustrating another frequency hopping configuration method according to some embodiments.

FIG. 13 is a flowchart illustrating another frequency hopping configuration method according to some embodiments. The frequency hopping configuration method may be used in a base station, and based on the method shown in FIG. 12, the frequency hopping configuration may be a specified frequency hopping offset. When performing step 130, as shown in FIG. 13, the method may include the following steps 1310 to 1320.

In step 1310, third indication information is generated, and the third indication information includes a specified frequency hopping offset corresponding to a BWP with which the terminal being configured currently.

In step 1320, the third indication information is sent to the terminal, so that the terminal obtains the specified frequency hopping offset corresponding to the BWP with which the terminal being configured currently according to the third indication information.

It can be seen from the foregoing embodiment that the specified frequency hopping offset corresponding to the BWP with which the terminal being configured currently indicated by the base station can be sent to the terminal through the third indication information, so that the terminal can accurately obtain the specified frequency hopping offset corresponding to the BWP with which the terminal being configured currently from the third indication information, thereby improving the accuracy of the frequency hopping configuration.

Figure 14:
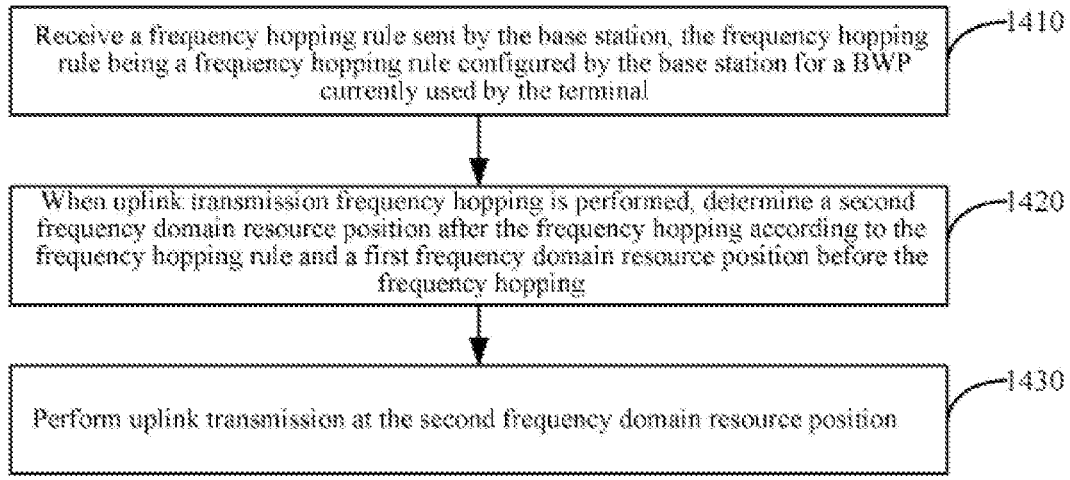
FIG. 14 is a flowchart illustrating a frequency hopping configuration method according to some embodiments.

FIG. 14 is a flowchart illustrating a frequency hopping configuration method according to some embodiments. The frequency hopping configuration method may be used for a terminal, and the base station configures the terminal with at least one BWP. As shown in FIG. 14, the frequency hopping configuration method may include the following steps 1410-1430.

In step 1410, a frequency hopping configuration sent by the base station is received, where the frequency hopping configuration is a frequency hopping configuration configured by the base station for a BWP with which the terminal being configured currently.

In step 1420, when uplink transmission frequency hopping is performed, a second frequency domain resource position after the frequency hopping is determined according to the frequency hopping configuration and a first frequency domain resource position before the frequency hopping.

In step 1430, uplink transmission is performed at the second frequency domain resource position.

It can be seen from the above embodiments that by receiving the frequency hopping configuration sent by the base station, the frequency hopping configuration being the frequency hopping configuration configured by the base station for the BWP with which the terminal being configured currently, and when performing uplink transmission frequency hopping, determining the second frequency domain resource position after frequency hopping according to the frequency hopping configuration and the first frequency domain resource position, and performing uplink transmission at the second frequency domain resource position, uplink transmission frequency hopping under the frequency hopping configuration indicated by the base station can be achieved, which not only reduces uplink scheduling complexity, but also reduces fragmentation of system resources and improves system resource utilization efficiency.

Figure 15:
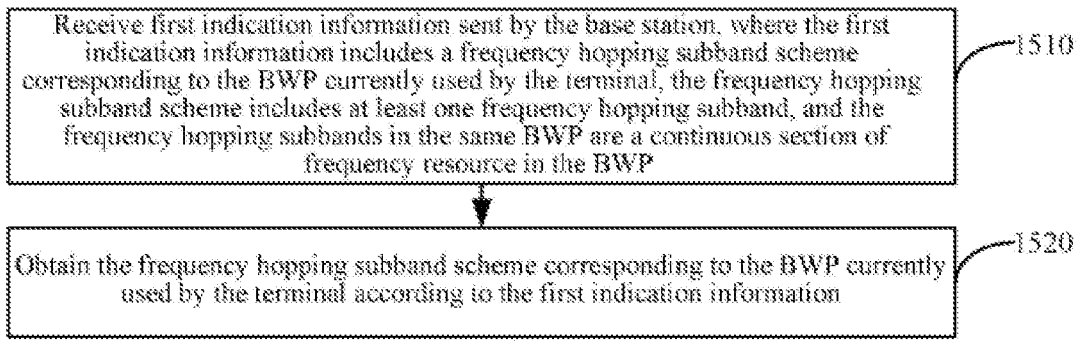
FIG. 15 is a flowchart illustrating another frequency hopping configuration method according to some embodiments.

FIG. 15 is a flowchart illustrating another frequency hopping configuration method according to some embodiments. The frequency hopping configuration method may be used for a terminal, and based on the method shown in FIG. 14, the frequency hopping configuration may be a frequency hopping subband scheme. When step 1410 is performed, as shown in FIG. 15, the following steps 1510-1520 may be included.

In step 1510, first indication information sent by the base station is received, where the first indication information includes a frequency hopping subband scheme corresponding to the BWP with which the terminal being configured currently, and the frequency hopping subband scheme includes at least one frequency hopping subband, and the frequency hopping subbands in the same BWP are a section of continuous frequency resources in the BWP.

In step 1520, the frequency hopping subband scheme corresponding to the BWP with which the terminal being configured currently is obtained according to the first indication information.

It can be seen from the foregoing embodiment that the frequency hopping subband scheme corresponding to the BWP with which the terminal being configured currently can be accurately obtained from the first indication information, thereby improving the reliability of the terminal obtaining the frequency hopping subband scheme.

Figure 16:
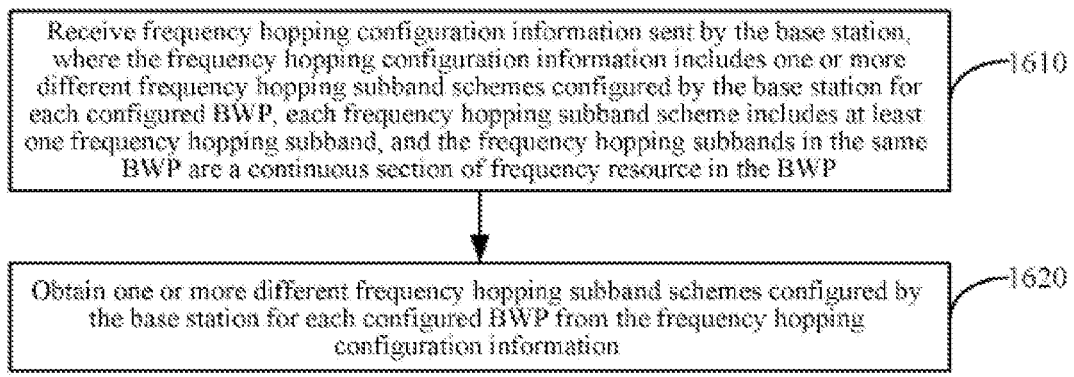
FIG. 16 is a flowchart illustrating another frequency hopping configuration method according to some embodiments.

FIG. 16 is a flowchart illustrating another frequency hopping configuration method according to some embodiments. The frequency hopping configuration method may be used for a terminal, and based on the method shown in FIG. 14, the frequency hopping configuration may be a frequency hopping subband scheme. As shown in FIG. 16, the frequency hopping configuration method may further include the following steps 1610-1620.

In step 1610, frequency hopping configuration information sent by the base station is received, where the frequency hopping configuration information includes one or more different frequency hopping subband schemes configured by the base station for each configured BWP, and each frequency hopping subband scheme includes at least one frequency hopping subband, and the frequency hopping subbands in the same BWP are a section of continuous frequency resources in the BWP.

In step 1620, one or more different frequency hopping subband schemes configured by the base station for each configured BWP are obtained from the frequency hopping configuration information.

It can be seen from the above embodiments that the specific content of one or more different frequency hopping subband schemes configured by the base station for each configured BWP can be known in advance from the frequency hopping configuration information, and when the base station instructs to perform uplink transmission frequency hopping, the frequency hopping subband scheme corresponding to the BWP with which the terminal being configured currently can be determined according to the frequency hopping subband scheme identifier indicated by the base station, thereby enriching the implementation manners of the terminal determining the frequency hopping subband scheme corresponding to the BWP currently used, and improving the efficiency of the terminal obtaining the frequency hopping subband scheme.

Figure 17:
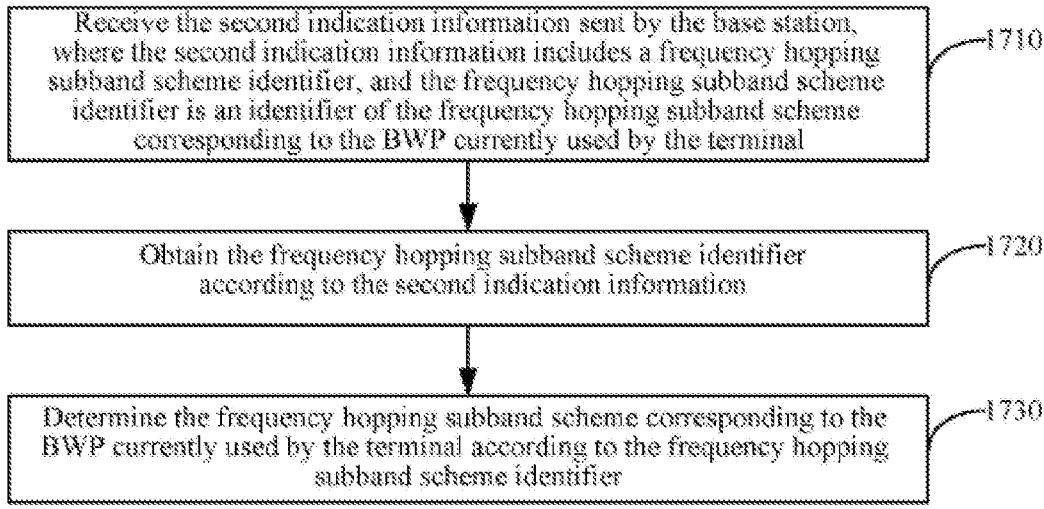
FIG. 17 is a flowchart illustrating another frequency hopping configuration method according to some embodiments.

FIG. 17 is a flowchart illustrating another frequency hopping configuration method according to some embodiments. The frequency hopping configuration method may be used for a terminal, and based on the method shown in FIG. 16, the frequency hopping configuration may be a frequency hopping subband scheme. When step 1410 is performed, as shown in FIG. 17, the following steps 1710 to 1730 may be included.

In step 1710, the second indication information sent by the base station is received. The second indication information includes a frequency hopping subband scheme identifier, and the frequency hopping subband scheme identifier is an identifier of the frequency hopping subband scheme corresponding to the BWP with which the terminal being configured currently.

In step 1720, the frequency hopping subband scheme identifier is obtained according to the second indication information.

In step 1730, the frequency hopping subband scheme corresponding to the BWP with which the terminal being configured currently is determined according to the frequency hopping subband scheme identifier.

It can be seen from the foregoing embodiment that the frequency hopping subband scheme identifier indicated by the base station can be obtained through the second indication information, and the frequency hopping subband scheme corresponding to the BWP with which the terminal being configured currently is determined according to the frequency hopping subband scheme identifier indicated by the base station, thereby ensuring that the frequency hopping subband scheme corresponding to the BWP currently used is determined, and also improving the efficiency of the terminal obtaining the frequency hopping subband scheme.

Figure 18:
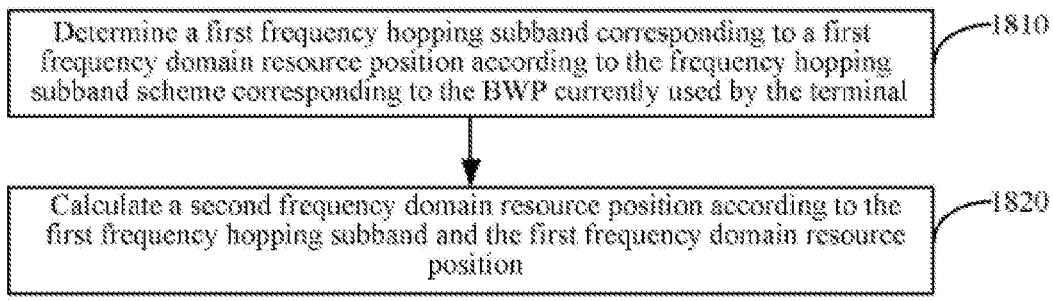
FIG. 18 is a flowchart illustrating another frequency hopping configuration method according to some embodiments.

FIG. 18 is a flowchart illustrating another frequency hopping configuration method according to some embodiments. The frequency hopping configuration method may be used for a terminal, and based on the method shown in FIG. 15 or FIG. 17, the frequency hopping configuration may be the frequency hopping subband scheme. When step 1420 is performed, as shown in FIG. 18, the following steps 1810 to 1820 may be included.

In step 1810, a first frequency hopping subband corresponding to a first frequency domain resource position is determined according to the frequency hopping subband scheme corresponding to the BWP with which the terminal being configured currently.

In step 1820, a second frequency domain resource position is calculated according to the first frequency hopping subband and the first frequency domain resource position.

It can be seen from the foregoing embodiments that the first frequency hopping subband corresponding to the first frequency domain resource position may be determined according to the frequency hopping subband scheme corresponding to the BWP with which the terminal being configured currently, and according to the first frequency hopping subband and the first frequency domain resource position, the second frequency domain resource position is calculated, thereby realizing the determination of the second frequency domain resource position after the frequency hopping under the frequency hopping subband scheme indicated by the base station, and improving the efficiency of completing the frequency hopping of the uplink transmission.

Figure 19:
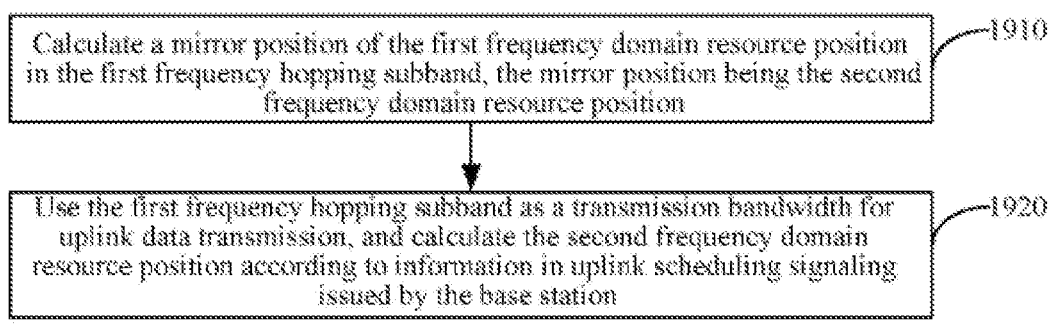
FIG. 19 is a flowchart illustrating another frequency hopping configuration method according to some embodiments.

FIG. 19 is a flowchart illustrating another frequency hopping configuration method according to some embodiments. The frequency hopping configuration method may be used for a terminal, and based on the method shown in FIG. 18, the frequency hopping configuration may be a frequency hopping subband solution. When step 1820 is performed, as shown in FIG. 19, the subband solution may include the following step 1910 or step 1920.

In step 1910, a mirror position of the first frequency domain resource position in the first frequency hopping subband is calculated, and the mirror position is the second frequency domain resource position.

In step 1920, the first frequency hopping subband is used as a transmission bandwidth for uplink data transmission, and the second frequency domain resource position is calculated according to information in uplink scheduling signaling sent by the base station.

It can be seen from the above embodiments that the mirror position of the first frequency domain resource position in the first frequency hopping subband can be calculated, the mirror position being the second frequency domain resource position; or the first frequency hopping subband is used as the transmission bandwidth of uplink data transmission, and the second frequency domain resource position is calculated according to the information in the uplink scheduling signaling sent by the base station, thereby enriching the implementation manners of determining the second frequency domain resource position and improving the efficiency of completing uplink transmission frequency hopping.

Figure 20:
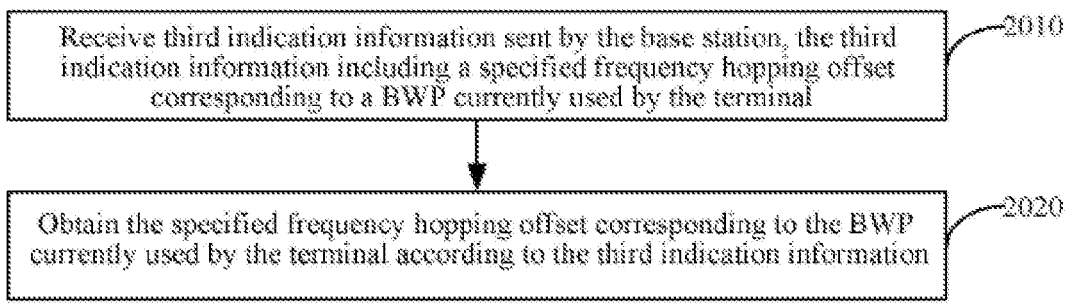
FIG. 20 is a flowchart illustrating another frequency hopping configuration method according to some embodiments.

FIG. 20 is a flowchart illustrating another frequency hopping configuration method according to some embodiments. The frequency hopping configuration method may be used for a terminal, and based on the method shown in FIG. 14, the frequency hopping configuration may be a specified frequency hopping offset. When step 1410 is performed, as shown in FIG. 20, the method may include the following steps 2010-2020.

In step 2010, third indication information sent by the base station is received, and the third indication information includes a specified frequency hopping offset corresponding to a BWP with which the terminal being configured currently.

In step 2020, the specified frequency hopping offset corresponding to the BWP with which the terminal being configured currently is obtained according to the third indication information.

It can be seen from the foregoing embodiment that the specified frequency hopping offset corresponding to the BWP with which the terminal being configured currently can be accurately obtained from the third indication information, thereby improving the reliability of the terminal in obtaining the specified frequency hopping offset.

Figure 21:
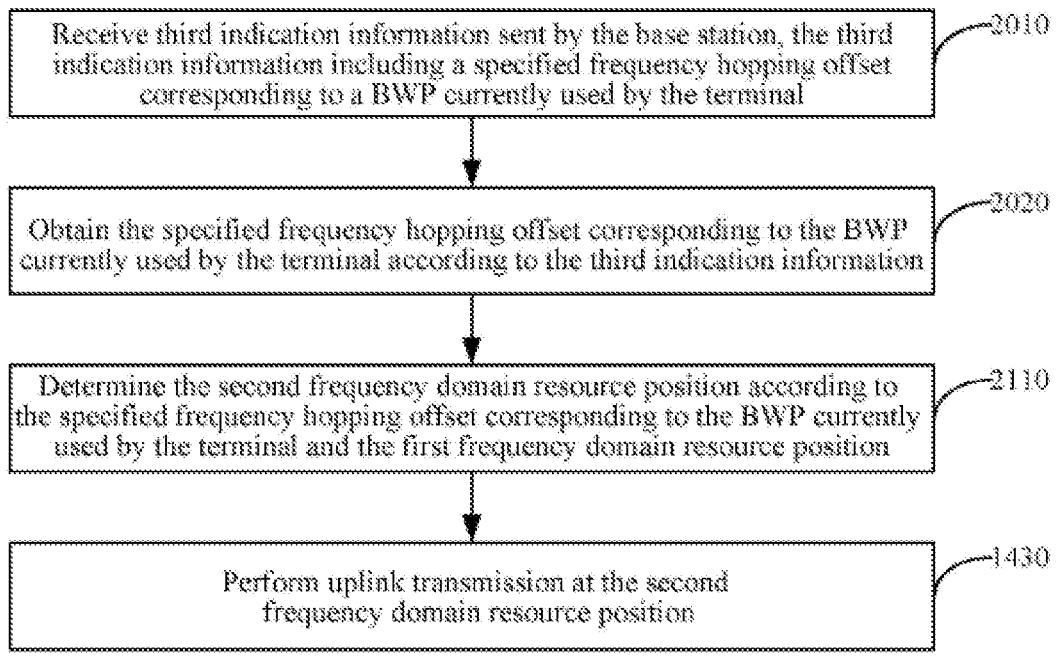
FIG. 21 is a flowchart illustrating another frequency hopping configuration method according to some embodiments.

FIG. 21 is a flowchart illustrating another frequency hopping configuration method according to some embodiments. The frequency hopping configuration method may be used for a terminal, and based on the method shown in FIG. 20, the frequency hopping configuration may be a specified frequency hopping offset. When performing step 1420, as shown in FIG. 21, the method may include the following step 2110.

In step 2110, the second frequency domain resource position is determined according to the specified frequency hopping offset corresponding to the BWP with which the terminal being configured currently and the first frequency domain resource position.

It can be seen from the above embodiments that the second frequency domain resource position can be determined according to the specified frequency hopping offset corresponding to the BWP with which the terminal being configured currently and the first frequency domain resource position, thereby achieving determination of the second frequency domain resource after frequency hopping under the specified frequency hopping offset indicated by the base station, and improving the efficiency of completing frequency hopping for uplink transmission.

Corresponding to the foregoing embodiments of the frequency hopping configuration method, the present disclosure also provides an embodiment of a frequency hopping configuration device.

Figure 22:
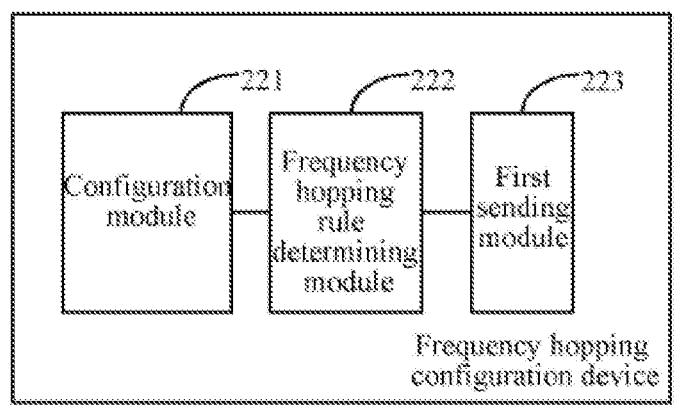
FIG. 22 is a block diagram illustrating a frequency hopping configuration device according to some embodiments.

FIG. 22 is a block diagram of a frequency hopping configuration device according to some embodiments. The device is used in a base station. The base station configures at least one BWP for a terminal and is used to perform the frequency hopping configuration method shown in FIG. 1. As shown in FIG. 22, the frequency hopping configuration device may include:

a configuration module 221 configured to configure a frequency hopping configuration for each configured BWP;

a frequency hopping configuration determining module 222 configured to, when instructing the terminal to perform uplink transmission frequency hopping, determine a frequency hopping configuration corresponding to a BWP with which the terminal being configured currently according to the configured frequency hopping configuration; and a first sending module 223 configured to send the corresponding frequency hopping configuration to a terminal, so that the terminal determines a second frequency domain resource position after frequency hopping according to the corresponding frequency hopping configuration and a first frequency domain resource position before the frequency hopping, and perform uplink transmission at the second frequency domain resource position.

It can be seen from the foregoing embodiments that by configuring a frequency hopping configuration for each configured BWP, when instructing the terminal to perform uplink transmission frequency hopping, determining the frequency hopping configuration corresponding to the BWP with which the terminal being configured currently according to the configured frequency hopping configuration, and sending the frequency hopping configuration corresponding to the BWP with which the terminal being configured currently to the terminal, the terminal can determine the second frequency domain resource position after frequency hopping according to the frequency hopping configuration indicated by the base station and the first frequency domain resource position before frequency hopping, and perform uplink transmission at the second frequency domain resource position, thereby realizing that the terminal completes uplink transmission frequency hopping under the frequency hopping configuration indicated by the base station, which not only reduces uplink scheduling complexity, but also reduces system resource fragmentation and improves system resource use efficiency.

Figure 23:
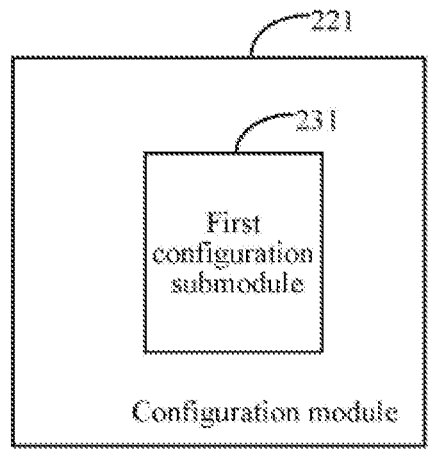
FIG. 23 is a block diagram illustrating another frequency hopping configuration device according to some embodiments.

In an embodiment, based on the device shown in FIG. 22, as shown in FIG. 23, the configuration module 221 may include:

a first configuration submodule 231 configured to configure one or more different frequency hopping subband schemes for each configured BWP. Each frequency hopping subband scheme includes at least one frequency hopping subband. In the same BWP, the frequency hopping subbands are a section of continuous frequency resources in the BWP.

It can be seen from the above embodiments that one or more different frequency hopping subband schemes can be configured for each configured BWP, each frequency hopping subband scheme includes at least one frequency hopping subband, and the frequency hopping subbands in the same BWP are a section of continuous frequency resources in the BWP, thus realizing the uplink transmission frequency hopping of the terminal under the frequency hopping subband scheme indicated by the base station, which not only enriches the implementation manners of frequency hopping configuration, but also improves the efficiency of system resource use.

Figure 24:
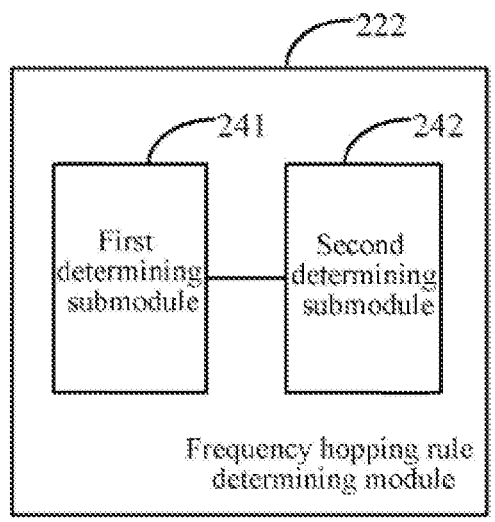
FIG. 24 is a block diagram illustrating another frequency hopping configuration device according to some embodiments.

In an embodiment, based on the device shown in FIG. 23, as shown in FIG. 24, the frequency hopping configuration determining module 222 may include:

a first determining submodule 241 configured to, if one frequency hopping subband scheme is configured for the BWP with which the terminal being configured currently, determine the frequency hopping subband scheme as the frequency hopping configuration corresponding to the BWP with which the terminal being configured currently; and a second determining submodule 242 configured to, if multiple frequency hopping subband schemes are configured for the BWP with which the terminal being configured currently, select one frequency hopping subband scheme from the multiple frequency hopping subband schemes and determine the selected frequency hopping subband scheme as the frequency hopping configuration corresponding to the BWP with which the terminal being configured currently.

It can be seen from the above embodiments that one or more frequency hopping subband schemes can be configured in advance for the BWP with which the terminal being configured currently, when the base station instructs the terminal to perform uplink transmission frequency hopping, it can select from these frequency hopping subband schemes configured in advance an appropriate frequency hopping subband scheme and allocate it to the terminal, which can avoid the problem of the decrease in the system resource use efficiency caused by different terminals using different BWPs, thereby improving the system resource use efficiency.

Figure 25:
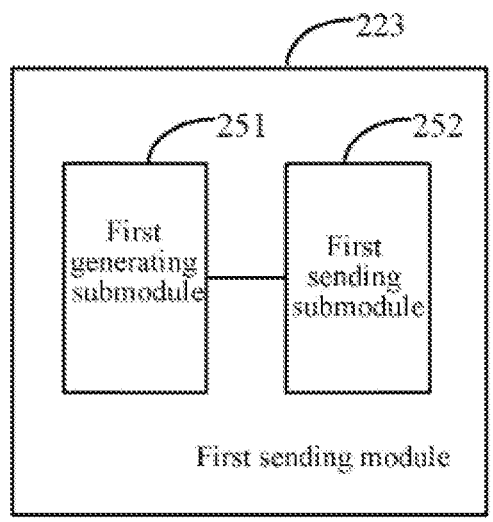
FIG. 25 is a block diagram illustrating another frequency hopping configuration device according to some embodiments.

In an embodiment, based on the device shown in FIG. 24, as shown in FIG. 25, the first sending module 223 may include:

a first generating submodule 251 configured to generate first indication information, where the first indication information includes a frequency hopping subband scheme corresponding to a BWP with which the terminal being configured currently; and a first sending submodule 252 configured to send the first indication information to the terminal, so that the terminal obtains the frequency hopping subband solution corresponding to the BWP with which the terminal being configured currently according to the first indication information.

It can be seen from the foregoing embodiment that the frequency hopping subband scheme corresponding to the BWP with which the terminal being configured currently indicated by the base station can be delivered to the terminal through the first indication information, so that the terminal can accurately obtain the frequency hopping subband scheme corresponding to the BWP with which the terminal being configured currently from the first indication information, thereby improving the accuracy of frequency hopping configuration.

Figure 26:
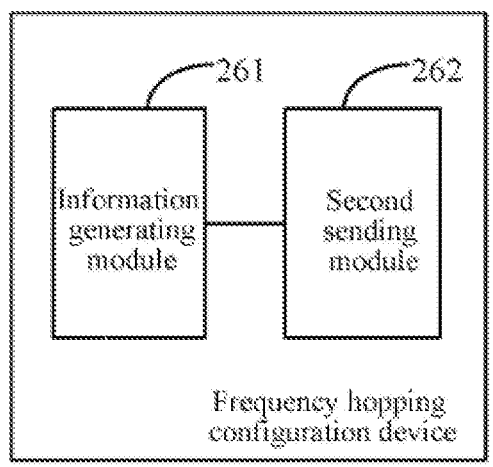
FIG. 26 is a block diagram illustrating another frequency hopping configuration device according to some embodiments.

In an embodiment, based on the device shown in FIG. 23, as shown in FIG. 26, the frequency hopping configuration device may further include:

an information generating module 261 configured to generate frequency hopping configuration information, where the frequency hopping configuration information includes one or more different frequency hopping subband schemes configured by the base station for each configured BWP;

a second sending module 262 configured to send the frequency hopping configuration information to the terminal, so that the terminal obtains, from the frequency hopping configuration information, one or multiple different frequency hopping subband schemes configured by the base station for each configured BWP.

It can be seen from the above embodiments that after the frequency hopping configuration are configured for each configured BWP, the base station may send one or more different frequency hopping subband schemes configured for each configured BWP to the terminal by using the frequency hopping configuration information, so that the terminal can know the specific content of these frequency hopping subband schemes in advance, and when the base station instructs the terminal to perform uplink translation frequency hopping, the frequency hopping subband scheme corresponding to the currently used BWP can be determined only by using the frequency hopping subband scheme identifier indicated by the base station, thereby improving the efficiency of frequency hopping configuration.

Figure 27:
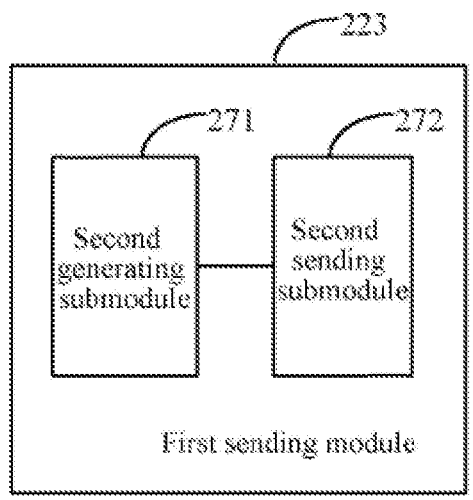
FIG. 27 is a block diagram illustrating another frequency hopping configuration device according to some embodiments.

In an embodiment, based on the device shown in FIG. 26, as shown in FIG. 27, the first sending module 223 may include:

a second generating submodule 271 configured to generate second indication information, where the second indication information includes a frequency hopping subband scheme identifier, and the frequency hopping subband scheme identifier is an identifier of the frequency hopping subband scheme corresponding to the BWP with which the terminal being configured currently;

a second sending submodule 272 configured to send the second indication information to the terminal, so that the terminal obtains the frequency hopping subband scheme identifier according to the second indication information, and determines the frequency hopping subband scheme corresponding to the BWP with which the terminal being configured currently according to the frequency subband scheme identifier.

It can be seen from the foregoing embodiments that the frequency hopping subband scheme identifier can be sent to the terminal through the second indication information, so that the terminal can determine the frequency hopping subband scheme corresponding to the BWP currently used by itself according to the frequency hopping subband scheme identifier indicated by the base station and the specific content of the different frequency hopping subband schemes obtained in advance, thereby ensuring that the terminal accurately determines the frequency hopping subband scheme corresponding to the BWP currently used, and also increasing the instruction speed of the frequency hopping configuration.

Figure 28:
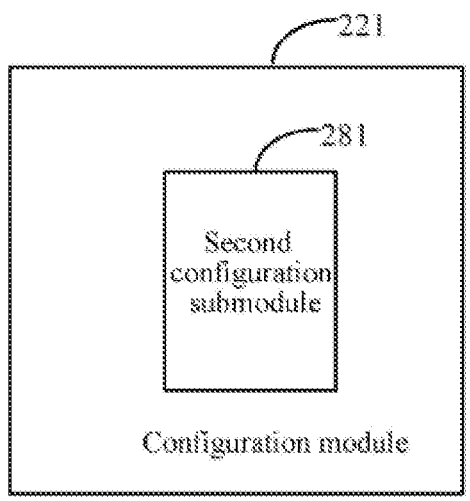
FIG. 28 is a block diagram illustrating another frequency hopping configuration device according to some embodiments.

In an embodiment, based on the device shown in FIG. 22, as shown in FIG. 28, the configuration module 221 may include:

a second configuration submodule 281 configured to configure one or more different specified frequency hopping offsets for each configured BWP.

It can be seen from the above embodiments that, by configuring one or more different specified frequency hopping offsets for each configured BWP, the terminal can complete the uplink transmission frequency hopping at the specified frequency hopping offset indicated by the base station, which not only enriches the implementation manners of the frequency hopping configuration, but also improves the speed of completing the frequency hopping for uplink transmission.

Figure 29:
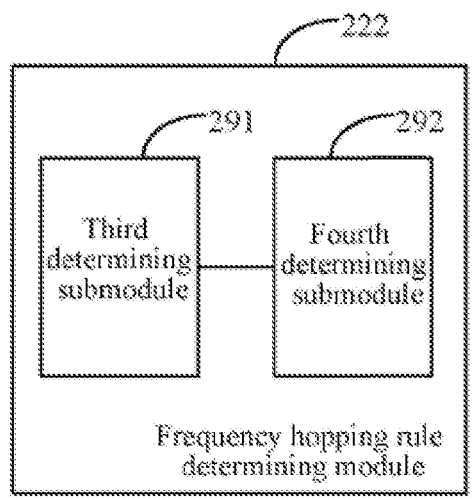
FIG. 29 is a block diagram illustrating another frequency hopping configuration device according to some embodiments.

In an embodiment, based on the device shown in FIG. 28, as shown in FIG. 29, the frequency hopping configuration determining module 222 may include:

a third determining submodule 291 configured to, if one specified frequency hopping offset is configured for the BWP with which the terminal being configured currently, determine the specified frequency hopping offset as the frequency hopping configuration corresponding to the BWP with which the terminal being configured currently;

a fourth determining submodule 292 configured to select a specified frequency hopping offset from the plurality of specified frequency hopping offsets if a plurality of specified frequency hopping offsets are configured for the BWP with which the terminal being configured currently. And determine the selected frequency hopping subband scheme as the frequency hopping configuration corresponding to the BWP with which the terminal being configured currently.

It can be seen from the above embodiments that one or more specified frequency hopping offsets can be configured in advance for the BWP with which the terminal being configured currently. When the base station instructs the terminal to perform uplink transmission frequency hopping, an appropriate specified frequency hopping offset may be selected from the specified frequency hopping offsets configured in advance and allocated to the terminal, so that the problem of the decrease in system resource use efficiency caused by different terminals using different BWPs can be avoided, thereby improving the system resource use efficiency.

Figure 30:
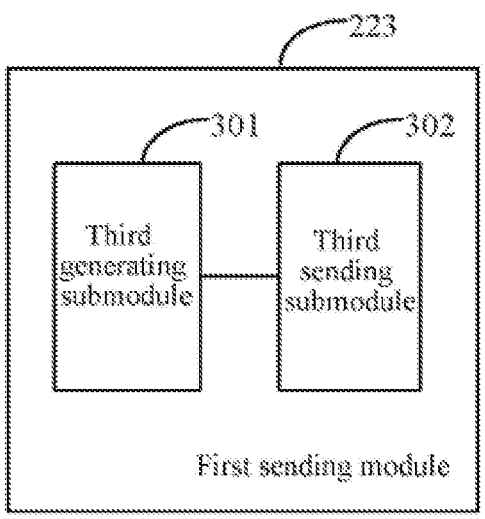
FIG. 30 is a block diagram illustrating another frequency hopping configuration device according to some embodiments.

In an embodiment, based on the device shown in FIG. 29, as shown in FIG. 30, the first sending module 223 may include:

a third generating submodule 301 configured to generate third indication information, where the third indication information includes a specified frequency hopping offset corresponding to the BWP with which the terminal being configured currently;

a third sending submodule 302 configured to send the third indication information to the terminal, so that the terminal obtains a specified frequency hopping offset corresponding to the BWP with which the terminal being configured currently according to the third indication information.

It can be seen from the foregoing embodiment that the specified frequency hopping offset corresponding to the BWP with which the terminal being configured currently indicated by the base station can be sent to the terminal through the third indication information, so that the terminal can accurately obtain the specified frequency hopping offset corresponding to the BWP with which the terminal being configured currently from the third indication information, thereby improving the accuracy of the frequency hopping configuration.

Figure 31:
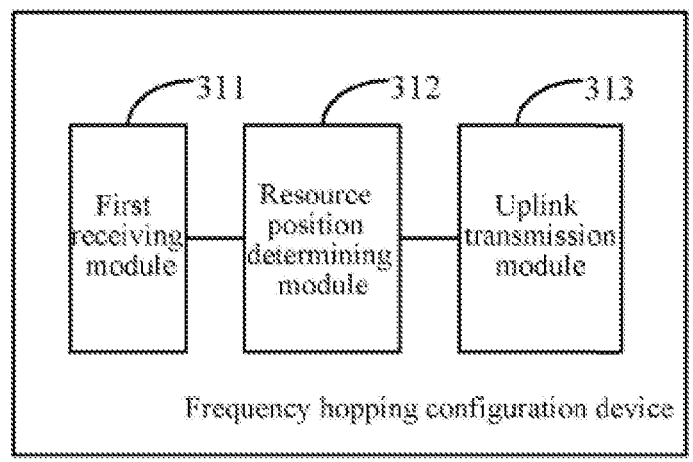
FIG. 31 is a block diagram illustrating a frequency hopping configuration device according to some embodiments.

FIG. 31 is a block diagram of a frequency hopping configuration device according to some embodiments. The device is used for a terminal, and the base station configures the terminal with at least one BWP, and is used to perform the frequency hopping configuration method shown in FIG. 14. As shown in FIG. 31, the frequency hopping configuration device may include:

a first receiving module 311 configured to receive a frequency hopping configuration sent by the base station, where the frequency hopping configuration is a frequency hopping configuration configured by the base station for a BWP with which the terminal being configured currently;

a resource position determining module 312 configured to, when performing uplink transmission frequency hopping, determine a second frequency domain resource position after frequency hopping according to the frequency hopping configuration and a first frequency domain resource position before the frequency hopping;

an uplink transmission module 313 configured to perform uplink transmission at the second frequency domain resource position.

It can be seen from the above embodiments that by receiving the frequency hopping configuration sent by the base station, the frequency hopping configuration being the frequency hopping configuration configured by the base station for the BWP with which the terminal being configured currently, when performing uplink transmission frequency hopping, determining the second frequency domain resource position after frequency hopping according to the frequency hopping configuration and the first frequency domain resource position before frequency hopping, and performing uplink transmission at the second frequency domain resource position, uplink transmission frequency hopping can be achieved under the frequency hopping configuration indicated by the base station, which not only reduces uplink scheduling complexity, but also reduces fragmentation of system resources and improves system resource utilization efficiency.

Figure 32:
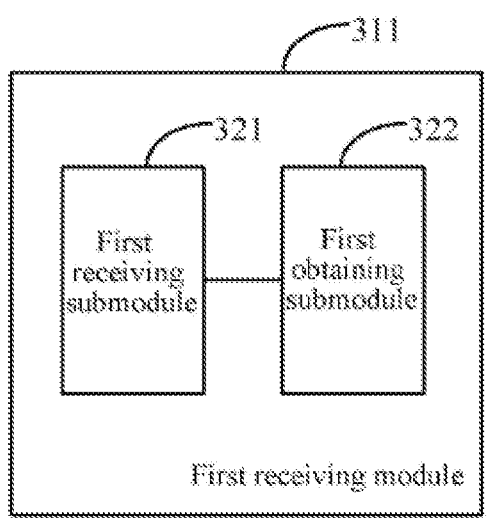
FIG. 32 is a block diagram illustrating a frequency hopping configuration device according to some embodiments.

In an embodiment, based on the device shown in FIG. 31, as shown in FIG. 32, the first receiving module 311 may include:

a first receiving submodule 321 configured to receive first indication information sent by the base station, where the first indication information includes a frequency hopping subband scheme corresponding to a BWP with which the terminal being configured currently, the frequency hopping subband scheme includes at least one frequency hopping subband, and the frequency hopping subbands in the same BWP are a section of continuous frequency resources in the BWP;

a first obtaining submodule 322 configured to obtain a frequency hopping subband scheme corresponding to the BWP with which the terminal being configured currently according to the first indication information.

It can be seen from the foregoing embodiment that the frequency hopping subband scheme corresponding to the BWP with which the terminal being configured currently can be accurately obtained from the first indication information, thereby improving the reliability of the terminal obtaining the frequency hopping subband scheme.

Figure 33:
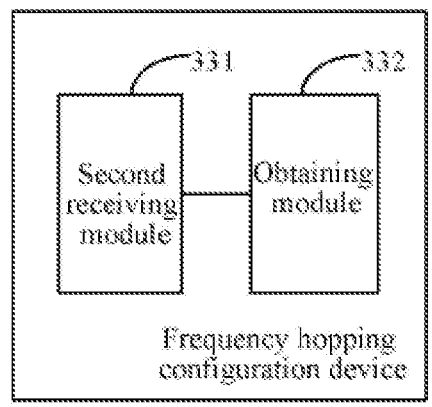
FIG. 33 is a block diagram illustrating a frequency hopping configuration device according to some embodiments.

In an embodiment, based on the device shown in FIG. 31, as shown in FIG. 33, the frequency hopping configuration device may further include:

a second receiving module 331 configured to receive frequency hopping configuration information sent by the base station, where the frequency hopping configuration information includes one or more different frequency hopping subband schemes configured by the base station for each configured BWP, each frequency hopping subband scheme includes at least one frequency hopping subband, and the frequency hopping subbands in the same BWP are a section of continuous frequency resources in the BWP;

an obtaining module 332 configured to obtain, from the frequency hopping configuration information, one or more different frequency hopping subband schemes configured by the base station for each configured BWP.

It can be seen from the above embodiments that the specific content of one or more different frequency hopping subband schemes configured by the base station for each configured BWP can be known in advance from the frequency hopping configuration information, and when the base station instructs to perform uplink transmission frequency hopping, the frequency hopping subband scheme corresponding to the BWP currently used can be determined according to the frequency hopping subband scheme identifier indicated by the base station, thereby enriching the implementation manners of the terminal determining the frequency hopping subband scheme corresponding to the BWP currently used, and improving the efficiency of obtaining the frequency hopping subband scheme by the terminal.

Figure 34:
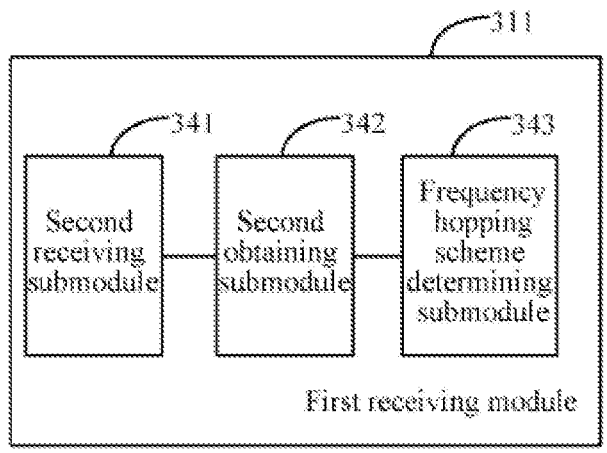
FIG. 34 is a block diagram illustrating a frequency hopping configuration device according to some embodiments.

In an embodiment, based on the device shown in FIG. 33, as shown in FIG. 34, the first receiving module 311 may include:

a second receiving submodule 341 configured to receive second indication information sent by the base station, where the second indication information includes a frequency hopping subband scheme identifier, and the frequency hopping subband scheme identifier is a current identifier used by the terminal. Identification of the frequency hopping subband scheme corresponding to the BWP;

a second obtaining submodule 342 configured to acquire the frequency hopping subband scheme identifier according to the second indication information;

a frequency hopping scheme determining submodule 343 configured to determine, according to the frequency hopping subband scheme identifier, a frequency hopping subband scheme corresponding to the BWP with which the terminal being configured currently.

It can be seen from the foregoing embodiment that the frequency hopping subband scheme identifier indicated by the base station can be obtained through the second indication information, and the frequency hopping subband scheme corresponding to the BWP currently used by the base station is determined according to the frequency hopping subband scheme identifier indicated by the base station, thereby ensuring that the frequency hopping subband scheme corresponding to the BWP currently used is determined, and the efficiency of obtaining the frequency hopping subband scheme by the terminal is also improved.

Figure 35:
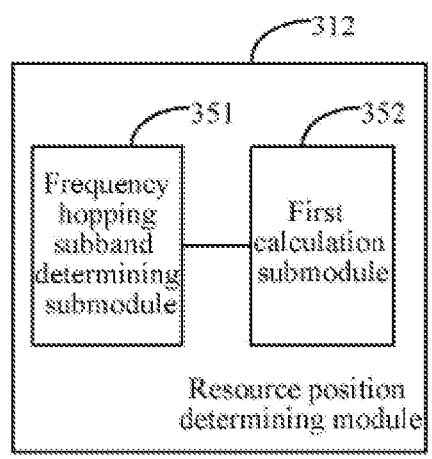
FIG. 35 is a block diagram illustrating a frequency hopping configuration device according to some embodiments.

In an embodiment, based on the device shown in FIG. 32 or FIG. 34, as shown in FIG. 35, the resource position determining module 312 may include:

a frequency hopping subband determining submodule 351 configured to determine a first frequency hopping subband corresponding to the first frequency domain resource position according to the frequency hopping subband scheme corresponding to the BWP with which the terminal being configured currently;

a first calculation submodule 352 configured to calculate a second frequency domain resource position according to the first frequency hopping subband and the first frequency domain resource position.

It can be seen from the foregoing embodiments that the first frequency hopping subband corresponding to the first frequency domain resource position may be determined according to the frequency hopping subband scheme corresponding to the BWP with which the terminal being configured currently, and according to the first frequency hopping subband and the first frequency domain resource position, the second frequency domain resource position is calculated, thereby realizing the determination of the second frequency domain resource position after the frequency hopping under the frequency hopping subband scheme indicated by the base station, and improving the efficiency of completing the frequency hopping of the uplink transmission.

Figure 36:
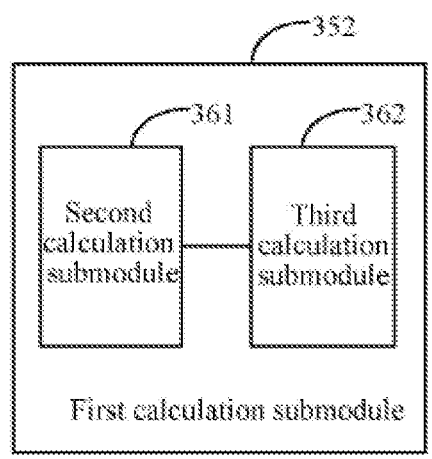
FIG. 36 is a block diagram illustrating a frequency hopping configuration device according to some embodiments.

In an embodiment, based on the device shown in FIG. 35, as shown in FIG. 36, the first calculation submodule 352 may include:

a second calculation submodule 361 configured to calculate a mirror position of the first frequency domain resource position in the first frequency hopping subband, the mirror position being the second frequency domain resource position; or a third calculation submodule 362 configured to use the first frequency hopping subband as a transmission bandwidth for uplink data transmission, and calculate the second frequency domain resource position according to information in uplink scheduling signaling sent by the base station.

It can be seen from the above embodiments that the mirror position of the first frequency domain resource position in the first frequency hopping subband can be calculated, and the mirror position is the second frequency domain resource position; or the first frequency hopping subband is used as the uplink data transmission bandwidth, and the second frequency domain resource position is calculated according to the information in the uplink scheduling signaling sent by the base station, thereby enriching the implementation manners of determining the second frequency domain resource position and improving the efficiency of completing uplink transmission frequency hopping.

Figure 37:
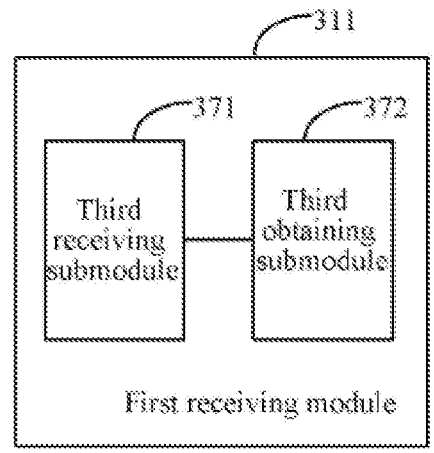
FIG. 37 is a block diagram illustrating a frequency hopping configuration device according to some embodiments.

In an embodiment, based on the device shown in FIG. 31, as shown in FIG. 37, the first receiving module 311 may include:

a third receiving submodule 371 configured to receive third indication information sent by the base station, where the third indication information includes a specified frequency hopping offset corresponding to the BWP with which the terminal being configured currently;

a third obtaining submodule 372 configured to obtain the specified frequency hopping offset corresponding to the BWP with which the terminal being configured currently according to the third indication information.

It can be seen from the foregoing embodiment that the specified frequency hopping offset corresponding to the BWP with which the terminal being configured currently can be accurately obtained from the third indication information, thereby improving the reliability of obtaining the specified frequency hopping offset by the terminal.

Figure 38:
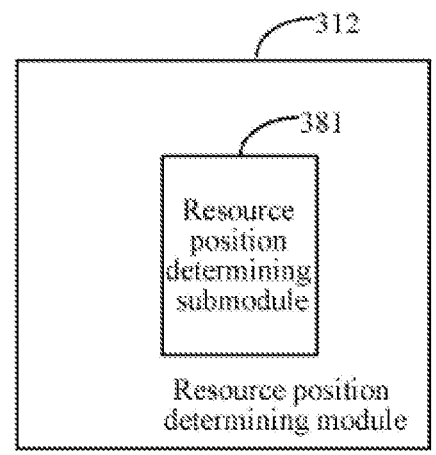
FIG. 38 is a block diagram illustrating a frequency hopping configuration device according to some embodiments.

In an embodiment, based on the device shown in FIG. 37, as shown in FIG. 38, the resource position determining module 312 may include:

a resource position determining submodule 381 configured to determine a second frequency domain resource position according to the specified frequency hopping offset corresponding to the BWP with which the terminal being configured currently and the first frequency domain resource position.

It can be seen from the above embodiments that the second frequency domain resource position can be determined according to the specified frequency hopping offset corresponding to the BWP with which the terminal being configured currently and the first frequency domain resource position, thereby achieving the determination of the second frequency domain resource position after frequency hopping under the specified frequency hopping offset indicated by the base station, which improves the efficiency of completing frequency hopping for uplink transmission.

As for the device embodiments, since they basically correspond to the method embodiments, the relevant contents may refer to the description of the method embodiments. The device embodiments described above are only schematic, in which the units described as separate components may or may not be physically separated, and the components shown as units may or may not be physical units, that is, they may be located in one place, or may be distributed in multiple network elements. Some or all of the modules can be selected according to actual needs to achieve the objectives of the solutions of the present disclosure. Those of ordinary skill in the art can understand and implement them without creative efforts.

The present disclosure also provides a non-transitory computer-readable storage medium. A computer program is stored on the storage medium, and the computer program is configured to execute the frequency hopping configuration method described in any one of FIG. 1 to FIG. 13.

The present disclosure also provides a non-transitory computer-readable storage medium. A computer program is stored on the storage medium, and the computer program is configured to execute the frequency hopping configuration method described in any one of FIG. 14 to FIG. 21.

The present disclosure also provides a frequency hopping configuration device. The device is used in a base station. The base station configures at least one BWP for a terminal. The device includes:

a processor; and memory storing instructions executable by the processor;

where the processor is configured to:

configure a frequency hopping configuration for each configured BWP;

when instructing the terminal to perform uplink transmission frequency hopping, determine a frequency hopping configuration corresponding to a BWP with which the terminal being configured currently according to the configured frequency hopping configuration; and send the corresponding frequency hopping configuration to the terminal, so that the terminal determines a second frequency domain resource position after the frequency hopping according to the corresponding frequency hopping configuration and a first frequency domain resource position before the frequency hopping, and perform uplink transmission at the second frequency domain resource position.

Figure 39:
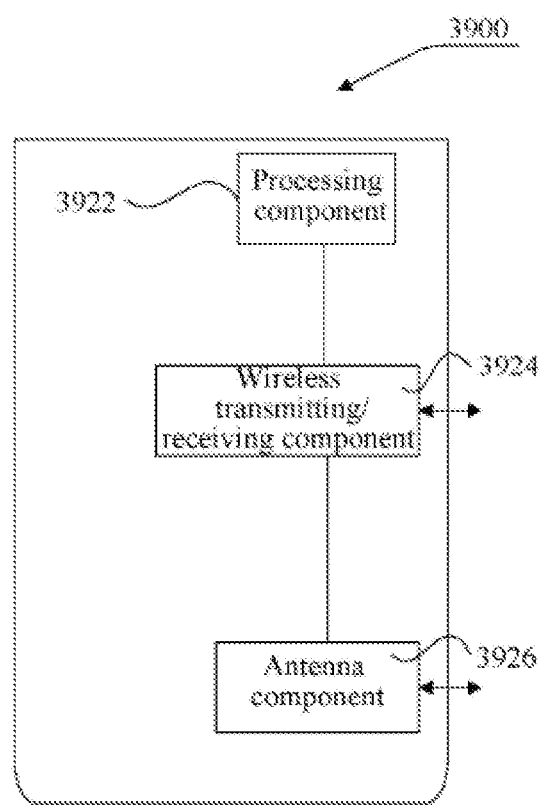
FIG. 39 is a schematic structural diagram illustrating a frequency hopping configuration device according to some embodiments.

FIG. 39 is a schematic structural diagram of a frequency hopping configuration device according to some embodiments. As shown in FIG. 39, the device 3900 may be provided as a base station. Referring to FIG. 39, the device 3900 includes a processing component 3922, a wireless transmitting/receiving component 3924, an antenna component 3926, and a signal processing portion unique to a wireless interface. The processing component 3922 may further include one or more processors.

One of the processors in the processing component 3922 may be configured to perform any of the frequency hopping configuration methods described above.

The present disclosure also provides a frequency hopping configuration device. The device is used for a terminal. The base station configures the terminal with at least one BWP. The device includes:

a processor; and memory storing instructions executable by the processor;

wherein the processor is configured to:

receive a frequency hopping configuration sent by the base station, wherein the frequency hopping configuration is a frequency hopping configuration configured by the base station for a BWP with which the terminal being configured currently;

when performing uplink transmission frequency hopping, determine a second frequency domain resource position after the frequency hopping according to the frequency hopping configuration and a first frequency domain resource position before the frequency hopping; and perform uplink transmission at the second frequency domain resource position.

Figure 40:
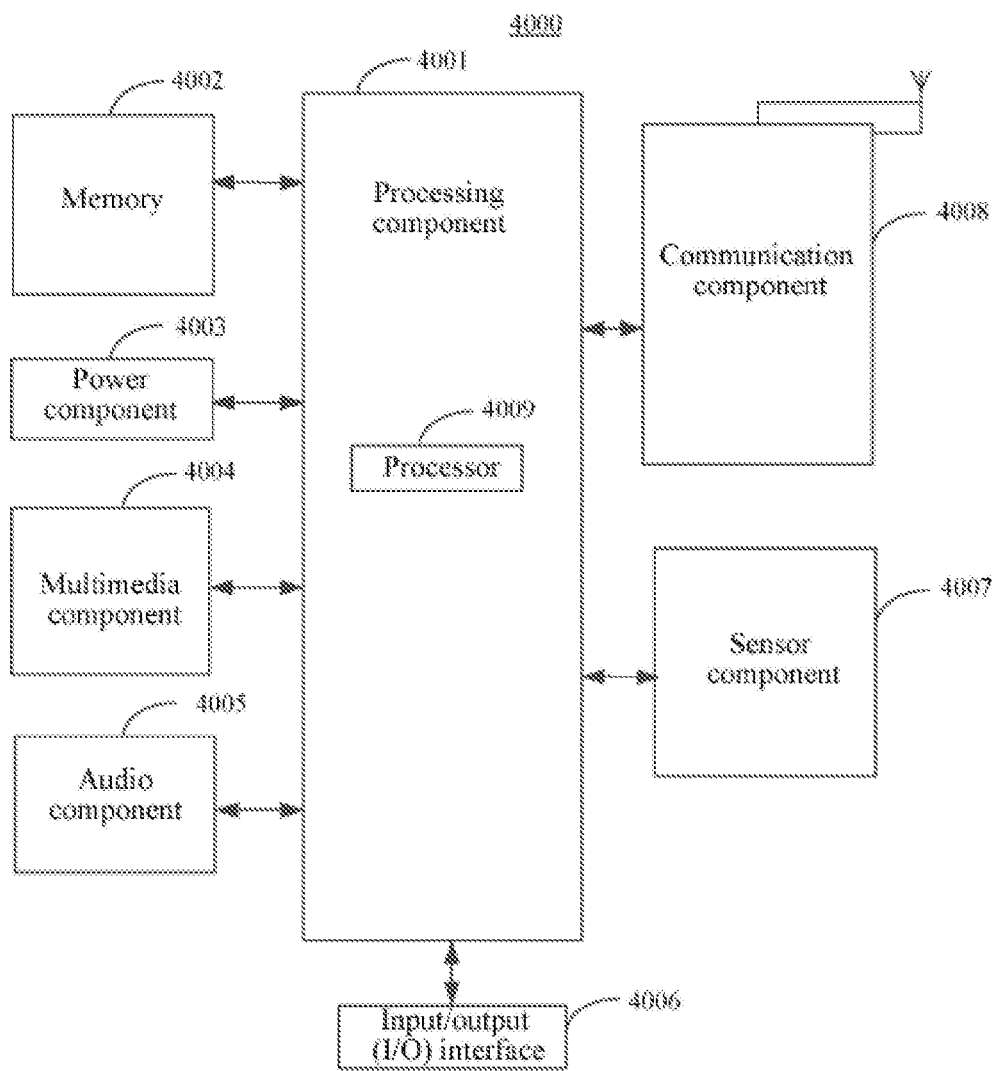
FIG. 40 is a schematic structural diagram illustrating a frequency hopping configuration device according to some embodiments.

FIG. 40 is a schematic structural diagram illustrating a frequency hopping configuration device according to some embodiments. As shown in FIG. 40, the frequency hopping configuration device 4000 according to some embodiments may be a computer, a mobile phone, a digital broadcast terminal, a messaging device, a gaming console, a tablet, a medical device, exercise equipment, a personal digital assistant, and other terminals.

Referring to FIG. 40, the device 4000 may include one or more of the following components: a processing component 4001, a memory 4002, a power component 4003, a multimedia component 4004, an audio component 4005, an input/output (I/O) interface 4006, a sensor component 4007, and a communication component 4008.

The processing component 4001 typically controls overall operations of the device 4000, such as the operations associated with display, telephone calls, data communications, camera operations, and recording operations. The processing component 4001 may include one or more processors 1220 to execute instructions to perform all or part of the steps in the above described methods. Moreover, the processing component 4001 may include one or more modules which facilitate the interaction between the processing component 4001 and other components. For instance, the processing component 4001 may include a multimedia module to facilitate the interaction between the multimedia component 4004 and the processing component 4001.

The memory 4002 is configured to store various types of data to support the operation of the device 4000. Examples of such data include instructions for any applications or methods operated on the device 4000, contact data, phonebook data, messages, pictures, video, etc. The memory 4002 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 4003 provides power to various components of the device 4000. The power component 4003 may include a power management system, one or more power sources, and any other components associated with the generation, management, and distribution of power in the device 4000.

The multimedia component 4004 includes a screen providing an output interface between the device 4000 and the user. In some embodiments, the screen may include a liquid crystal display (LCD) and a touch panel (TP). In some embodiments, organic light-emitting diode (OLED) or other types of displays can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 4004 includes a front camera and/or a rear camera. The front camera and the rear camera may receive an external multimedia datum while the device 4000 is in an operation mode, such as a photographing mode or a video mode. Each of the front camera and the rear camera may be a fixed optical lens system or have focus and optical zoom capability.

The audio component 4005 is configured to output and/or input audio signals. For example, the audio component 4005 includes a microphone ("MIC") configured to receive an external audio signal when the device 4000 is in an operation mode, such as a call mode, a recording mode, and a voice recognition mode. The received audio signal may be further stored in the memory 4002 or transmitted via the communication component 4008. In some embodiments, the audio component 4005 further includes a speaker to output audio signals.

The I/O interface 4006 provides an interface between the processing component 4001 and peripheral interface modules, such as a keyboard, a click wheel, buttons, and the like. The buttons may include, but are not limited to, a home button, a volume button, a starting button, and a locking button.

The sensor component 4007 includes one or more sensors to provide status assessments of various aspects of the device 4000. For instance, the sensor component 4007 may detect an open/closed status of the device 4000, relative positioning of components, e.g., the display and the keypad, of the device 4000, a change in position of the device 4000 or a component of the device 4000, a presence or absence of user contact with the device 4000, an orientation or an acceleration/deceleration of the device 4000, and a change in temperature of the device 4000. The sensor component 4007 may include a proximity sensor configured to detect the presence of nearby objects without any physical contact. The sensor component 4007 may also include a light sensor, such as a CMOS or CCD image sensor, for use in imaging applications. In some embodiments, the sensor component 4007 may also include an accelerometer sensor, a gyroscope sensor, a magnetic sensor, a pressure sensor, or a temperature sensor.

The communication component 4008 is configured to facilitate communication, wired or wirelessly, between the device 4000 and other devices. The device 4000 can access a wireless network based on a communication standard, such as Wi-Fi, 2G, 3G, 4G, or 5G, or a combination thereof. In one exemplary embodiment, the communication component 4008 receives a broadcast signal or broadcast associated information from an external broadcast management system via a broadcast channel. In one exemplary embodiment, the communication component 4008 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 4000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 4002, executable by the processor 4009 in the device 4000, for performing the above-described methods. For example, the non-transitory computer-readable storage medium may be a ROM, a RAM, a CD-ROM, a magnetic tape, a floppy disc, an optical data storage device, and the like.

In some embodiments, the operation of configuring a frequency hopping configuration for each configured BWP described above includes:

configuring one or more different frequency hopping subband schemes for each configured BWP, each frequency hopping subband scheme comprising at least one frequency hopping subband, and the frequency hopping subbands in the same BWP are a section of continuous frequency resources in the BWP.

In some embodiments, the determining, according to the configured frequency hopping configuration, a frequency hopping configuration corresponding to a BWP with which the terminal being configured currently, includes:

in response to one frequency hopping subband scheme is configured for the BWP with which the terminal being configured currently, determining the frequency hopping subband scheme as the frequency hopping configuration corresponding to the BWP with which the terminal being configured currently;

in response to a plurality of frequency hopping subband schemes are configured for the BWP with which the terminal being configured currently, selecting one frequency hopping subband scheme from the plurality of frequency hopping subband schemes, and determining the selected frequency hopping subband scheme as the frequency hopping configuration corresponding to the BWP with which the terminal being configured currently.

In some embodiments, the sending the corresponding frequency hopping configuration to the terminal includes:

generating first indication information, wherein the first indication information comprises the frequency hopping subband scheme corresponding to the BWP with which the terminal being configured currently; and sending the first indication information to the terminal, so that the terminal obtains the frequency hopping subband scheme corresponding to the BWP with which the terminal being configured currently according to the first indication information.

In some embodiments, the method further includes:

generating frequency hopping configuration information, wherein the frequency hopping configuration information comprises the one or more different frequency hopping subband schemes configured by the base station for each configured BWP; and sending the frequency hopping configuration information to the terminal, so that the terminal obtains, according to the frequency hopping configuration information, the one or more different frequency hopping subband schemes configured by the base station for each configured BWP.

In some embodiments, the sending the corresponding frequency hopping configuration to the terminal includes:

generating second indication information, wherein the second indication information comprises a frequency hopping subband scheme identifier, and the frequency hopping subband scheme identifier is an identifier of the frequency hopping subband scheme corresponding to the BWP with which the terminal being configured currently; and sending the second indication information to the terminal, so that the terminal obtains the frequency hopping subband scheme identifier according to the second indication information, and determines, according to the frequency hopping subband scheme identifier, the frequency hopping subband scheme corresponding to the BWP with which the terminal being configured currently.

In some embodiments, the configuring a frequency hopping configuration for each configured BWP, includes:

configuring one or more different specified frequency hopping offsets for each configured BWP.

In some embodiments, the determining, according to the configured frequency hopping configuration, a frequency hopping configuration corresponding to a BWP with which the terminal being configured currently, includes:

in response to one specified frequency hopping offset is configured for the BWP with which the terminal being configured currently, determining the frequency hopping offset as the frequency hopping configuration corresponding to the BWP with which the terminal being configured currently; and in response to a plurality of specified frequency hopping offsets are configured for the BWP with which the terminal being configured currently, selecting one specific frequency hopping offset from the plurality of specified frequency hopping offsets, and determining the selected frequency hopping subband scheme as the frequency hopping configuration corresponding to the BWP with which the terminal being configured currently.

In some embodiments, the sending the corresponding frequency hopping configuration to the terminal includes:

generating third indication information, wherein the third indication information comprises the specified frequency hopping offset corresponding to the BWP with which the terminal being configured currently; and sending the third indication information to the terminal, so that the terminal obtains, according to the third indication information, the specified frequency hopping offset corresponding to the BWP with which the terminal being configured currently.

In some embodiments, the receiving a frequency hopping configuration sent by the base station includes:

receiving first indication information sent by the base station, wherein the first indication information comprises a frequency hopping subband scheme corresponding to the BWP with which the terminal being configured currently, the frequency hopping subband scheme comprises at least one frequency hopping subband, and the frequency hopping subbands in the same BWP are a section of continuous frequency resources in the BWP; and obtaining the frequency hopping subband scheme corresponding to the BWP with which the terminal being configured currently according to the first indication information.

In some embodiments, the method further includes:

receiving frequency hopping configuration information sent by the base station, wherein the frequency hopping configuration information comprises one or more different frequency hopping subband schemes configured by the base station for each configured BWP, each of the frequency hopping subband schemes comprises at least one frequency hopping subband, and the frequency hopping subbands in the same BWP are a section of continuous frequency resources in the BWP; and obtaining, according to the frequency hopping configuration information, the one or more different frequency hopping subband schemes configured by the base station for each configured BWP.

In some embodiments, the receiving a frequency hopping configuration sent by the base station includes:

receiving second indication information sent by the base station, wherein the second indication information comprises a frequency hopping subband scheme identifier, and the frequency hopping subband scheme identifier is an identifier of the frequency hopping subband scheme corresponding to the BWP with which the terminal being configured currently;

obtaining the frequency hopping subband scheme identifier according to the second indication information; and determining, according to the frequency hopping subband scheme identifier, the frequency hopping subband scheme corresponding to the BWP with which the terminal being configured currently.

In some embodiments, the determining the second frequency domain resource position after the frequency hopping according to the frequency hopping configuration and the first frequency domain resource position before the frequency hopping, includes:

determining a first frequency hopping subband corresponding to the first frequency domain resource position according to the frequency hopping subband scheme corresponding to the BWP with which the terminal being configured currently; and calculating the second frequency domain resource position according to the first frequency hopping subband and the first frequency domain resource position.

In some embodiments, the calculating the second frequency domain resource position according to the first frequency hopping subband and the first frequency domain resource position includes:

calculating a mirror position of the first frequency domain resource position in the first frequency hopping subband, the mirror position being the second frequency domain resource position; or using the first frequency hopping subband as a transmission bandwidth for uplink data transmission, and calculating the second frequency domain resource position according to information in uplink scheduling signaling sent by the base station.

In some embodiments, the receiving a frequency hopping configuration sent by the base station includes:

receiving third indication information sent by the base station, wherein the third indication information comprises a specified frequency hopping offset corresponding to the BWP with which the terminal being configured currently; and obtaining, according to the third indication information, the specified frequency hopping offset corresponding to the BWP with which the terminal being configured currently.

In some embodiments, the determining the second frequency domain resource position after the frequency hopping according to the frequency hopping configuration and the first frequency domain resource position before the frequency hopping includes:

determining the second frequency domain resource position according to the specified frequency hopping offset corresponding to the BWP with which the terminal being configured currently and the first frequency domain resource position.

In some embodiments, the configuration module includes:

a first configuration submodule configured to configure one or more different frequency hopping subband schemes for each configured BWP, each frequency hopping subband scheme comprising at least one frequency hopping subband, and the frequency hopping subbands in the same BWP are a section of continuous frequency resources.

In some embodiments, the frequency hopping configuration determining module includes:

a first determining submodule configured to, in response to one frequency hopping subband scheme is configured for the BWP with which the terminal being configured currently, determine the frequency hopping subband scheme as the frequency hopping configuration corresponding to the BWP with which the terminal being configured currently; and a second determining submodule configured to, in response to a plurality of frequency hopping subband schemes are configured for the BWP with which the terminal being configured currently, select one frequency hopping subband scheme from the plurality of frequency hopping subband schemes, and determine the selected frequency hopping subband scheme as the frequency hopping configuration corresponding to the BWP the terminal being configured with currently.

In some embodiments, the first sending module includes:
a first generating submodule configured to generate first indication information, wherein the first indication information comprises the frequency hopping subband scheme corresponding to the BWP with which the terminal being configured currently; and a first sending submodule configured to send the first indication information to the terminal, so that the terminal obtains the frequency hopping subband scheme corresponding to the BWP with which the terminal being configured currently, according to the first indication information.

In some embodiments, the device further includes:
an information generating module configured to generate frequency hopping configuration information, wherein the frequency hopping configuration information comprises one or more different frequency hopping subband schemes configured by the base station for each configured BWP; and a second sending module configured to send the frequency hopping configuration information to the terminal, so that the terminal obtains, according to the frequency hopping configuration information, the one or one different frequency hopping subband schemes configured by the base station for each configured BWP.

In some embodiments, the first sending module includes:
a second generating submodule configured to generate second indication information, wherein the second indication information comprises a frequency hopping subband scheme identifier, and the frequency hopping subband scheme identifier is an identifier of the frequency hopping subband scheme corresponding to the BWP with which the terminal being configured currently; and a second sending submodule configured to send the second indication information to the terminal, so that the terminal obtains the frequency hopping subband scheme identifier according to the second indication information, and determine the frequency hopping subband scheme corresponding to the BWP with which the terminal being configured currently according to the frequency hopping subband scheme identifier.

In some embodiments, the configuration module includes:
a second configuration submodule configured to configure one or more different specified frequency hopping offsets for each configured BWP.

In some embodiments, the frequency hopping configuration determining module includes:
a third determining submodule configured to, when one specified frequency hopping offset is configured for the BWP with which the terminal being configured currently, determine this specified frequency hopping offset as the frequency hopping configuration corresponding to the BWP with which the terminal being configured currently; and a fourth determining submodule configured to, in response to a plurality of frequency hopping subband schemes are configured for the BWP with which the terminal being configured currently, select one specified frequency hopping offset from the plurality of specified frequency hopping offsets, and determine the selected frequency hopping subband scheme as the frequency hopping configuration corresponding to the BWP with which the terminal being configured currently.

In some embodiments, the first sending module includes:
a third generating submodule configured to generate third indication information, wherein the third indication information comprises the specified frequency hopping offset corresponding to the BWP with which the terminal being configured currently; and a third sending submodule configured to send the third indication information to the terminal, so that the terminal obtains, according to the third indication information, the specified frequency hopping offset corresponding to the BWP with which the terminal being configured currently.

In some embodiments, the first receiving module includes:
a first receiving submodule configured to receive first indication information sent by the base station, wherein the first indication information comprises a frequency hopping subband scheme corresponding to the BWP with which the terminal being configured currently, the frequency hopping subband scheme comprises at least one frequency hopping subband, and the frequency hopping subbands in the same BWP are a section of continuous frequency resource in the BWP; and a first obtaining submodule configured to obtain the frequency hopping subband scheme corresponding to the BWP with which the terminal being configured currently according to the first indication information.

In some embodiments, the device further includes:
a second receiving module configured to receive frequency hopping configuration information sent by the base station, wherein the frequency hopping configuration information comprises one or more different frequency hopping subband schemes configured by the base station for each configured BWP, each of the frequency hopping subband schemes comprises at least one frequency hopping subband, and the frequency hopping subbands in the same BWP are a section of continuous frequency resources in the BWP; and an obtaining module configured to obtain one or more different frequency hopping subband schemes configured by the base station for each configured BWP from the frequency hopping configuration information.

In some embodiments, the first receiving module includes:
a second receiving submodule configured to receive second indication information sent by the base station, wherein the second indication information comprises a frequency hopping subband scheme identifier, and the frequency hopping subband scheme identifier is an identifier of the frequency hopping subband scheme corresponding to the BWP with which the terminal being configured currently;

a second obtaining submodule configured to obtain the frequency hopping subband scheme identifier according to the second indication information; and a frequency hopping scheme determining submodule configured to determine, according to the frequency hopping subband scheme identifier, the frequency hopping subband scheme corresponding to the BWP with which the terminal being configured currently.

In some embodiments, the resource position determining module includes:
a frequency hopping subband determining submodule configured to determine a first frequency hopping subband corresponding to the first frequency domain resource position according to the frequency hopping subband scheme corresponding to the BWP with which the terminal being configured currently; and a first calculation submodule configured to calculate the second frequency domain resource position according to the first frequency hopping subband and the first frequency domain resource position.

In some embodiments, the first calculation submodule includes:

a second calculation submodule configured to calculate a mirror position of the first frequency domain resource position in the first frequency hopping subband, the mirror position being the second frequency domain resource position; or a third calculation submodule configured to use the first frequency hopping subband as a transmission bandwidth for uplink data transmission, and calculate the second frequency domain resource position according to information in uplink scheduling signaling sent by the base station.

In some embodiments, the first receiving module includes:

a third receiving submodule configured to receive third indication information sent by the base station, wherein the third indication information comprises a specified frequency hopping offset corresponding to the BWP with which the terminal being configured currently; and a third obtaining submodule configured to obtain the specified frequency hopping offset corresponding to the BWP with which the terminal being configured currently according to the third indication information.

In some embodiments, the resource position determining module includes:

a resource position determining submodule configured to determine the second frequency domain resource position according to the specified frequency hopping offset corresponding to the BWP with which the terminal being configured currently and the first frequency domain resource position.

Various embodiments of the present disclosure can have one or more of the following advantages.

The base station in the present disclosure can configure the frequency hopping configuration for each configured BWP, determine the frequency hopping configuration corresponding to the BWP with which the terminal being configured currently when instructing the terminal to perform uplink transmission frequency hopping, and send the frequency hopping configuration corresponding to the BWP with which the terminal being configured currently to the terminal, so that the terminal can determine the second frequency domain resource position after frequency hopping according to the frequency hopping configuration indicated by the base station and the first frequency domain resource position before frequency hopping, and perform the uplink transmission at the second frequency domain resource position, thereby the terminal can complete the uplink transmission frequency hopping under the frequency hopping configuration indicated by the base station, which not only reduces the complexity of uplink scheduling, but also reduces the fragmentation of system resources, thereby improving the utilization efficiency of the system resource.

The terminal in the present disclosure can receive the frequency hopping configuration sent by the base station. The frequency hopping configuration is the frequency hopping configuration configured by the base station for the BWP with which the terminal being configured currently. When performing uplink transmission frequency hopping, the terminal determines the second frequency domain resource position after the frequency hopping according to the frequency hopping configuration and the first frequency domain resource position before the frequency hopping, and performs uplink transmission at the second frequency domain resource position, thereby achieving the completion of uplink transmission frequency hopping under the frequency hopping configuration indicated by the base station, reducing the complexity of the uplink scheduling, reducing the system resource fragmentation, and improving system resource utilization efficiency.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

In some embodiments, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A frequency hopping configuration method, wherein the method is applied in a base station, and the base station configures a plurality of bandwidth parts (BWPs) for a user equipment (UE) involving a frequency hopping, wherein the base station configures different frequency hopping configurations for different user equipments (UEs) to which the base station is connected, the method comprising:
   determining a frequency hopping configuration for each of the plurality of BWPs corresponding to the UE, wherein the frequency hopping configuration is associated with one frequency hopping offset or a plurality of frequency hopping offsets;
   determining, according to the determined frequency hopping configuration, a frequency hopping configuration corresponding to a BWP with which the UE is being configured currently, wherein the UE is configured with a plurality of BWPs, and each BWP is configured with a frequency hopping configuration, wherein the frequency hopping configuration for each BWP is same or different;
   scheduling a plurality of UEs to perform transmission on a frequency domain resource position to which the UE is to be hopped according to the frequency hopping configuration corresponding to the BWP the UE is being configured currently; and
   sending the corresponding frequency hopping configuration to the UE, such that the UE determines, according to the corresponding frequency hopping configuration and a first frequency domain resource position before the frequency hopping, a second frequency domain resource position after the frequency hopping.

2. The method according to claim 1, wherein the determining a frequency hopping configuration comprises:
   determining one or more different frequency hopping offsets for the BWP with which the UE is being configured currently.

3. The method according to claim 2, wherein the determining, according to the determined frequency hopping configuration, a frequency hopping configuration corresponding to a BWP with which the UE is being configured currently comprises:
   in response to one frequency hopping offset being configured for the BWP with which the UE is being configured currently, determining the one frequency hopping offset as the frequency hopping configuration corresponding to the BWP with which the UE is being configured currently; and
   in response to a plurality of frequency hopping offsets being configured for the BWP with which the UE is being configured currently, determining one frequency hopping offset from the plurality of frequency hopping offsets, and determining the determined one frequency hopping offset as the frequency hopping configuration corresponding to the BWP with which the UE is being configured currently.

4. The method according to claim 3, wherein the sending the corresponding frequency hopping configuration to the UE comprises:
   determining third indication information, wherein the third indication information comprises the frequency hopping offset corresponding to the BWP with which the UE is being configured currently; and sending the third indication information to the UE, so that the UE obtains, according to the third indication information, the frequency hopping offset corresponding to the BWP with which the UE is being configured currently.

5. A frequency hopping configuration method, wherein the method is applied in a user equipment (UE) involving a frequency hopping, and the UE is configured, by a base station, a plurality of bandwidth parts (BWPs), wherein the UE connects to the base station, and the base station configures different frequency hopping configurations for different user equipments (UEs) to which the base station is connected; the method comprising:

receiving a frequency hopping configuration, wherein the frequency hopping configuration is a frequency hopping configuration configured for a BWP with which the UE is being configured currently, wherein the frequency hopping configuration is associated with one frequency hopping offset or a plurality of frequency hopping offsets, wherein the UE is configured with a plurality of BWPs, and each BWP is configured with a frequency hopping configuration, wherein the frequency hopping configuration for each BWP is same or different;

performing by a plurality of UEs transmission on a frequency domain resource position to which the UE is to be hopped according to the frequency hopping configuration corresponding to the BWP the UE is being configured currently; and determining, according to the received frequency hopping configuration and a first frequency domain resource position before the frequency hopping, a second frequency domain resource position after the frequency hopping.

6. The method according to claim 5, further comprising:
receiving one or more different frequency hopping offsets for the BWP with which the UE is being configured currently.

7. The method according to claim 6, wherein the determining, according to the received frequency hopping configuration and a first frequency domain resource position before the frequency hopping, a second frequency domain resource position after the frequency hopping comprises:

in response to one frequency hopping offset being configured for the BWP with which the UE is being configured currently, determining the one frequency hopping offset as the frequency hopping configuration corresponding to the BWP with which the UE is being configured currently; and in response to a plurality of frequency hopping offsets being configured for the BWP with which the UE is being configured currently, determining one frequency hopping offset from the plurality of frequency hopping offsets, and determining the determined one frequency hopping offset as the frequency hopping configuration corresponding to the BWP with which the UE is being configured currently.

8. The method according to claim 7, wherein the receiving a frequency hopping configuration comprises:
receiving third indication information, wherein the third indication information comprises the frequency hopping offset corresponding to the BWP with which the UE is being configured currently; and
obtaining, according to the third indication information, the frequency hopping offset corresponding to the BWP with which the UE is being configured currently.

9. The method according to claim 8, wherein the receiving a frequency hopping configuration further comprises:
obtaining, according to received third indication information, the frequency hopping offset corresponding to the BWP with which the UE is being configured currently;
wherein the third indication information comprises the frequency hopping offset corresponding to the BWP with which the UE is being configured currently.

10. The method according to claim 5, further comprising:
performing uplink transmission according to the second frequency domain resource position.

11. A frequency hopping configuration device, wherein the device is applied in a base station, the base station configures a plurality of bandwidth parts (BWPs) for a user equipment (UE) involving a frequency hopping, wherein the device connects to a base station, and the base station configures different frequency hopping configurations for different user equipments (UEs) to which the base station is connected; the device comprising:

a processor; and
memory storing instructions executable by the processor;
wherein the processor is configured to:
determine a frequency hopping configuration for each of the plurality of BWPs corresponding to the UE, wherein the frequency hopping configuration is associated with one frequency hopping offset or a plurality of frequency hopping offsets;
determine, according to the determined frequency hopping configuration, a frequency hopping configuration corresponding to a BWP with which the UE is being configured currently, wherein the UE is configured with a plurality of BWPs, and each BWP is configured with a frequency hopping configuration, wherein the frequency hopping configuration for each BWP is same or different;
schedule a plurality of UEs to perform transmission on a frequency domain resource position to which the UE is to be hopped according to the frequency hopping configuration corresponding to the BWP the UE is being configured currently; and
send the corresponding frequency hopping configuration to the UE, so that the UE determines, according to the corresponding frequency hopping configuration and a first frequency domain resource position before the frequency hopping, a second frequency domain resource position after the frequency hopping.

12. The device according to claim 11, wherein the processor is further configured to:
determine one or more different frequency hopping offsets for the BWP with which the UE is being configured currently.

13. The device according to claim 12, wherein the processor is further configured to:
in response to one frequency hopping offset being configured for the BWP with which the UE is being configured currently, determine the frequency hopping offset as the frequency hopping configuration corresponding to the BWP with which the UE is being configured currently; and
in response to a plurality of frequency hopping offsets being configured for the BWP with which the UE is being configured currently, determining one frequency hopping offset from the plurality of frequency hopping offsets, and determining the determined one frequency hopping offset as the frequency hopping configuration corresponding to the BWP with which the UE is being configured currently.

14. The device according to claim 13, wherein the processor is further configured to:
  determine third indication information, wherein the third indication information comprises the frequency hopping offset corresponding to the BWP with which the UE is being configured currently; and
  send the third indication information to the UE, so that the UE obtains, according to the third indication information, the frequency hopping offset corresponding to the BWP with which the UE is being configured currently.

15. A frequency hopping configuration device, wherein the device is applied in a user equipment (UE) involving a frequency hopping, and the UE is configured, by a base station, a plurality of bandwidth parts (BWPs), wherein the UE connects to the base station, and the base station configures different frequency hopping configurations for different user equipments (UEs) to which the base station is connected; the device comprising:
  a processor; and
  memory storing instructions executable by the processor;
  wherein the processor is configured to:
  receive a frequency hopping configuration, wherein the frequency hopping configuration is a frequency hopping configuration configured for a BWP with which the UE is being configured currently, wherein the frequency hopping configuration is associated with one frequency hopping offset or a plurality of frequency hopping offsets, wherein the UE is configured with a plurality of BWPs, and each BWP is configured with a frequency hopping configuration, wherein the frequency hopping configuration for each BWP is same or different;
  perform transmission on a frequency domain resource position to which the UE is to be hopped according to the frequency hopping configuration corresponding to the BWP the UE is being configured currently; and
  determine, according to the received frequency hopping configuration and a first frequency domain resource position before the frequency hopping, a second frequency domain resource position after the frequency hopping.

16. The device according to claim 15, wherein the processor is further configured to:
  receive one or more different frequency hopping offsets for the BWP with which the UE is being configured currently.

17. The device according to claim 16, wherein the processor is further configured to:
  in response to one frequency hopping offset being configured for the BWP with which the UE is being configured currently, determine the frequency hopping offset as the frequency hopping configuration corresponding to the BWP with which the UE is being configured currently; and
  in response to a plurality of frequency hopping offsets being configured for the BWP with which the UE is being configured currently, determine one frequency hopping offset from the plurality of frequency hopping offsets, and determine the determined one frequency hopping offset as the frequency hopping configuration corresponding to the BWP with which the UE is being configured currently.

18. The device according to claim 17, wherein the processor is further configured to:
  receive third indication information, wherein the third indication information comprises the frequency hopping offset corresponding to the BWP with which the UE is being configured currently; and
  obtain, according to the third indication information, the frequency hopping offset corresponding to the BWP with which the UE is being configured currently.

19. The device according to claim 18, wherein the processor is further configured to:
  obtain, according to the received third indication information, the frequency hopping offset corresponding to the BWP with which the UE is being configured currently;
  wherein the third indication information comprises the frequency hopping offset corresponding to the BWP with which the UE is being configured currently.

20. The device according to claim 15, wherein the processor is further configured to:
  perform uplink transmission according to the second frequency domain resource position.

21. A communication system implementing the method according to claim 1, comprising the base station and the UE, wherein the UE is configured to:
  determine the second frequency domain resource position after the frequency hopping according to the frequency hopping configuration sent by the base station and the first frequency domain resource position before the frequency hopping; and
  perform the uplink transmission at the second frequency domain resource position, thereby completing the frequency hopping under the frequency hopping configuration sent by the base station, reducing complexity of uplink scheduling and fragmentation of system resources, while improving utilization efficiency of the system resources.

* * * * *